(12) United States Patent
Hatanaka et al.

(10) Patent No.: US 8,786,116 B2
(45) Date of Patent: Jul. 22, 2014

(54) VEHICLE CONTROL DEVICE AND DIESEL HYBRID VEHICLE SYSTEM

(75) Inventors: Keita Hatanaka, Tokyo (JP); Takafumi Maruyama, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 14 days.

(21) Appl. No.: 13/817,391

(22) PCT Filed: Aug. 26, 2010

(86) PCT No.: PCT/JP2010/064508
§ 371 (c)(1),
(2), (4) Date: Feb. 15, 2013

(87) PCT Pub. No.: WO2012/026026
PCT Pub. Date: Mar. 1, 2012

(65) Prior Publication Data
US 2013/0154264 A1 Jun. 20, 2013

(51) Int. Cl.
| | | |
|---|---|---|
| *B60L 11/12* | (2006.01) | |
| *B60W 10/08* | (2006.01) | |
| *B60W 20/00* | (2006.01) | |
| *B60L 15/00* | (2006.01) | |
| *B60K 6/46* | (2007.10) | |
| *B60L 3/00* | (2006.01) | |
| *B60K 6/34* | (2007.10) | |

(52) U.S. Cl.
CPC ............. *B60L 11/12* (2013.01); *B60W 10/08* (2013.01); *B60W 20/50* (2013.01); *B60W 20/00* (2013.01); *B60L 15/007* (2013.01); *B60K 6/46* (2013.01); *Y02T 10/6217* (2013.01); *B60L 3/003* (2013.01); *B60K 6/34* (2013.01)
USPC .............................. 290/10; 307/104; 318/139

(58) Field of Classification Search
CPC .... B60L 15/007; B60L 11/06; B60L 2210/20
See application file for complete search history.

(56) References Cited

U.S. PATENT DOCUMENTS 7,119,513 B2 * 10/2006 Ishikawa ........................ 318/801
7,157,869 B2 *  1/2007 Ishikawa ........................ 318/139
(Continued)

FOREIGN PATENT DOCUMENTS

| EP | 2106954 A2 | 10/2009 |
|---|---|---|
| JP | 11-341607 A | 12/1999 |

(Continued)

OTHER PUBLICATIONS

International Search Report (PCT/ISA/210) issued on Nov. 9, 2010, by the Japanese Patent Office as the International Searching Authority for International Application No. PCT/JP2010/064508.

(Continued)

*Primary Examiner* — Michael Zarroli
(74) *Attorney, Agent, or Firm* — Buchanan Ingersoll & Rooney PC

(57) ABSTRACT

A vehicle control device includes a diesel engine, a motor configured to drive a vehicle, a generator configured to generate alternating-current power with an output of the diesel engine, a power storage device configured to charge and discharge direct-current power, a converter configured to convert the alternating-current power generated by the generator into direct-current power and output the direct-current power, and an inverter configured to convert the direct-current power discharged by the power storage device or the direct-current power output by the converter to drive the motor. The converter operates as an inverter during a breakdown of the inverter and drives the motor.

19 Claims, 23 Drawing Sheets

(56) References Cited

U.S. PATENT DOCUMENTS

2008/0205106 A1* 8/2008 Nakamura et al. ............ 363/123
2010/0013301 A1* 1/2010 Hamada et al. .............. 307/10.1
2012/0169130 A1* 7/2012 Shiraishi et al. ................ 307/80

FOREIGN PATENT DOCUMENTS

| | | |
|---|---|---|
| JP | 2004-312863 A | 11/2004 |
| JP | 2005-269705 A | 9/2005 |
| JP | 2009-254013 A | 10/2009 |

OTHER PUBLICATIONS

Written Opinion (PCT/ISA/237) issued on Nov. 9, 2010, by the Japanese Patent Office as the International Searching Authority for International Application No. PCT/JP2010/064508.

* cited by examiner

FIG.3

| No. | OPERATION STATE | FIRST SWITCH-ER 9 | SECOND SWITCH-ER 10 | THIRD SWITCH-ER 11 | FOURTH SWITCH-ER 12 | FIRST CON-TACTOR 13 | SECOND CON-TACTOR 14 | THIRD CON-TACTOR 15 | STARTUP OF ENGINE | CHARGING FROM GENERATOR |
|---|---|---|---|---|---|---|---|---|---|---|
| 1 | NORMAL STATE | a-b | a-b | b-c | ARBI-TRARY | ON | ON | ON | ○ | ○ |
| 2 | INV BREAKDOWN | b-c | b-c | b-c | a-b | ON | OFF | ON | | |
| 3 | INV BREAKDOWN | a-b | b-c | b-c | a-b | ON | OFF | ON | ○ | ○ |
| 4 | SIV BREAKDOWN | b-c | a-b | a-b | b-c | ON | ON | OFF | | |
| 5 | SIV BREAKDOWN | a-b | a-c | a-b | b-c | ON | ON | ON | ○ | ○ |
| 6 | CNV BREAKDOWN | a-c | a-b | b-c | a-b | OFF | ON | ON | ○ | ○ |
| 7 | CNV BREAKDOWN | a-c | a-b | b-c | a-b | OFF | ON | ON | | |
| 8 | CNV, INV BREAKDOWN | a-c | b-c | b-c | a-b | OFF | OFF | ON | | |
| 9 | CNV, INV BREAKDOWN | a-c | b-c | a-c | b-c | OFF | OFF | ON | ○ | ○ |
| 10 | CNV, INV BREAKDOWN | a-c | b-c | a-c | a-c | OFF | OFF | OFF | | |
| 11 | CNV, SIV BREAKDOWN | a-c | a-c | a-b | b-c | OFF | ON | OFF | | |
| 12 | CNV, SIV BREAKDOWN | a-c | a-c | a-b | a-c | OFF | ON | OFF | ○ | ○ |
| 13 | CNV, SIV BREAKDOWN | a-c | b-c | a-b | a-b | OFF | ON | OFF | | |
| 14 | INV, SIV BREAKDOWN | b-c | b-c | a-b | a-b | ON | OFF | OFF | ○ | ○ |
| 15 | INV, SIV BREAKDOWN | a-b | b-c | a-b | a-b | ON | OFF | OFF | | |
| 16 | INV, SIV BREAKDOWN | b-c | b-c | a-b | b-c | ON | OFF | OFF | | |
| 17 | INV, SIV, CNV BREAKDOWN | a-c | b-c | a-b | a-b | OFF | OFF | OFF | ○ | ○ |
| 18 | INV, SIV, CNV BREAKDOWN | a-c | b-c | a-b | b-c | OFF | OFF | OFF | ○ | ○ |

# VEHICLE CONTROL DEVICE AND DIESEL HYBRID VEHICLE SYSTEM

FIELD

The present invention relates to a diesel hybrid vehicle system and a vehicle control device applied to the diesel hybrid vehicle system.

BACKGROUND

A diesel hybrid vehicle system in the past drives a generator with a diesel engine, converts, with a converter, alternating-current power generated by the generator into direct-current power, concurrently uses the direct-current power converted by the converter and direct-current power supplied by a power storage device, converts, with an inverter, these kinds of direct-current power into alternating-current power, and drives a motor with the converted alternating-current power to thereby give propulsion to a vehicle (e.g., Patent Literature 1).

CITATION LIST

Patent Literature

Patent Literature 1: Japanese Patent Application Laid-open No. 2004-312863

SUMMARY

Technical Problem

However, in the diesel hybrid vehicle system in the past, there is a problem in that, when the inverter is disabled by a breakdown or the like, the motor cannot be driven and the service of the vehicle cannot be continued. There is also a problem in that, when an auxiliary power supply device (SIV) is disabled by a breakdown or the like, an auxiliary machine cannot be used and hindrance to continuation of the service is caused.

The present invention has been devised in view of the above and it is an object of the present invention to provide a vehicle control device and a diesel hybrid vehicle system that enable continuation of the service of a vehicle even if at least one of an inverter and an auxiliary power supply device is disabled by a breakdown or the like.

Solution to Problem

In order to solve the problems and attain the object, a vehicle control device according to the present invention includes: a diesel engine; a motor configured to drive a vehicle; a generator configured to generate alternating-current power with an output of the diesel engine; a power storage device configured to charge and discharge direct-current power; a converter configured to convert the alternating-current power generated by the generator into direct-current power and output the direct-current power; and an inverter configured to convert the direct-current power discharged by the power storage device or the direct-current power output by the converter into alternating-current power to drive the motor. The converter operates as an inverter and drives the motor when the inverter is disabled.

Advantageous Effects of Invention

With the vehicle control device according to the present invention, there is an effect that it is possible to continue the service of the vehicle even if the inverter is disabled by a breakdown or the like.

BRIEF DESCRIPTION OF DRAWINGS

FIG. 3 is a table of operation states of the diesel hybrid vehicle system and states of the first to fourth switchers and first to third contactors corresponding to the operation states.

DESCRIPTION OF EMBODIMENTS

Vehicle control devices and diesel hybrid vehicle systems according to embodiments of the present invention are explained below with reference to the accompanying drawings. The present invention is not limited by the embodiments explained below.

First Embodiment
Configurations of an Apparatus and a System

Figure 1:
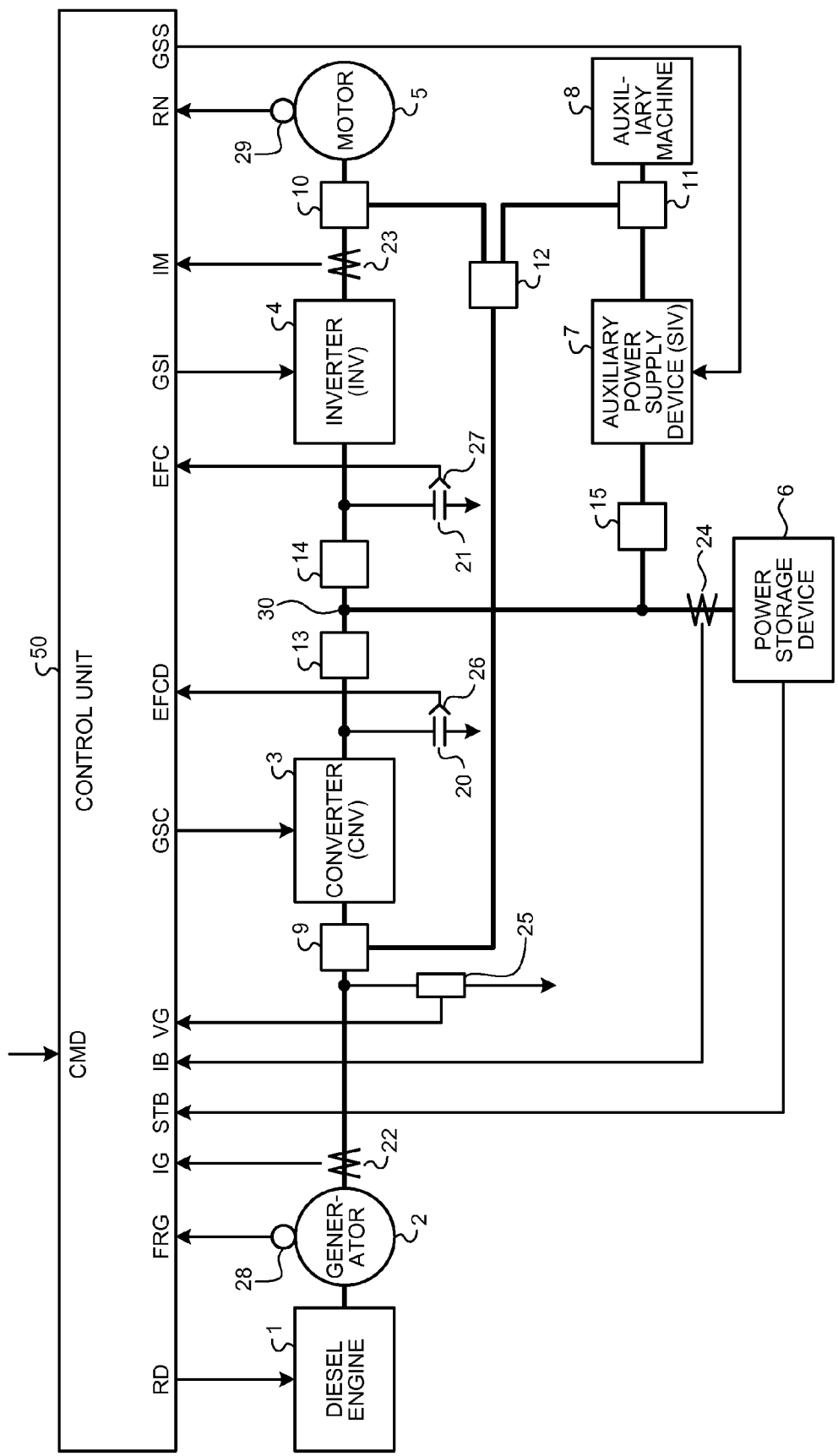
FIG. 1 is a diagram of a configuration example of a diesel hybrid vehicle system including a vehicle control device according to a first embodiment of the present invention.

FIG. 1 is a diagram of a configuration example of a diesel hybrid vehicle system including a vehicle control device according to a first embodiment of the present invention. The diesel hybrid vehicle system according to the first embodiment includes, as shown in FIG. 1, as main components, a diesel engine 1, a generator 2, a converter (CNV) 3, an inverter (INV) 4 functioning as a first inverter, a motor 5, a power storage device 6, an auxiliary power supply device (SIV) 7 functioning as a second inverter, an auxiliary machine 8, and a control unit 50 configured to manage the operation of the entire diesel hybrid vehicle system. Further, the diesel hybrid vehicle system includes first to fourth switchers 9 to 12 interposed among the components and configured to freely changes a connection relation among the components, first to third contactors 13 to 15, current detectors 22 to 24 functioning as sensors configured to detect an electric current, voltage detectors 25 to 27 functioning as sensor configured to detect a voltage, and rotation detectors 28 and 29 configured to detect the numbers of revolutions of a generator and a motor. Among these components, the vehicle control device according to the first embodiment includes the converter (CNV) 3, the inverter (INV) 4, and the auxiliary power supply device (SIV) 7. In FIG. 1, filter capacitors 20 and 21, voltages of which are detected by the voltage detectors 26 and 27, are also shown.

A connection relation among the units included in the diesel hybrid vehicle system and schematic functions of the units are explained.

The diesel engine 1 is one of driving sources that generates a driving force. The diesel engine 1 is connected to the generator 2. The generator 2 generates alternating-current power with an output of the diesel engine 1. The power storage device 6 is a storage device for electric energy including a lithium ion battery, a nickel hydrogen battery, an electric double layer capacitor, a lithium ion capacitor, a flywheel, or the like as storing means and is another driving source that generates a driving force. The power storage device 6 is connected to a connecting section (a direct-current voltage section) of the converter 3 and the inverter 4. The power storage device 6 charges and discharges direct-current power. The converter 3 converts the alternating-current power generated by the generator 2 into direct-current power and, on the other hand, converts the direct-current power discharged by the power storage device 6 into alternating-current power. The inverter 4 converts the direct-current power supplied from the converter 3 or the power storage device 6 into alternating-current power. The motor 5 receives the supply of the alternating-current power from the inverter 4 and generates a driving force (propulsion). The auxiliary power supply device 7 is connected to the direct-current voltage section. The auxiliary power supply device 7 converts direct-current power into alternating-current power having a fixed voltage and a fixed frequency and supplies the alternating-current power to the auxiliary machine 8. The auxiliary machine 8 is a general term of a load apparatus other than a driving apparatus.

Figure 2:
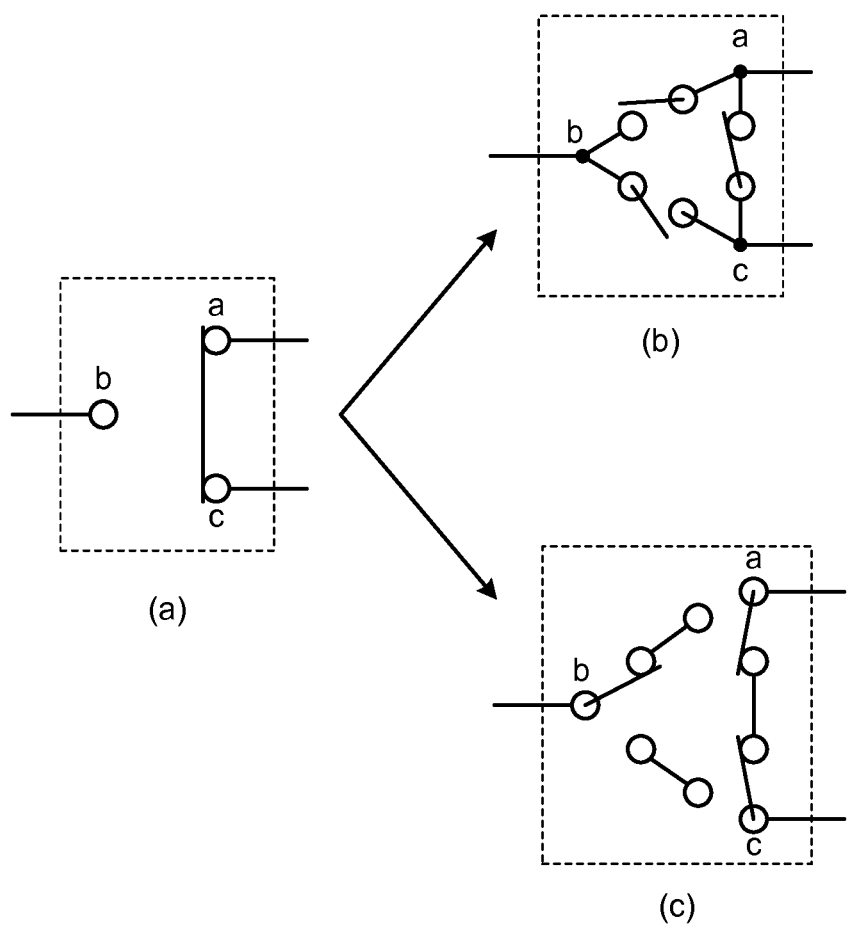
FIG. 2 is a diagram showing a configuration example of first to fourth switchers used in the diesel hybrid vehicle system according to the first embodiment.

The first to fourth switchers 9 to 12 include three connection ends a to c as shown in FIG. 2(a) and have a function of connecting arbitrary two connection ends among the three connection ends a to c. An example in which the switchers are configured by ON/OFF switches is FIG. 2(b). As shown in the figure, when the connection ends a and c are connected, it is sufficient to control the switches between c and a to ON, control the switch between a and b to OFF, and control the switch between b and c to OFF. An example in which the switchers are configured by changeover switches is FIG. 2(c). As in FIG. 2(b), when the connection ends a and c are connected, as shown in FIG. 2(c), it is sufficient to turn the a switch to the c side and turn the c switch to the a side (the position of the b switch is arbitrary).

Referring back to FIG. 1, the first switcher 9 is inserted among the three devices, i.e., the generator 2, the converter 3, and the fourth switcher 12. The first switcher 9 selects and connects two devices among the three devices. Similarly, the second switcher 10 is inserted among the three devices, i.e., the inverter 4, the motor 5, and the fourth switcher 12. The third switcher 11 is inserted among the three devices, i.e., the auxiliary power supply device 7, the auxiliary machine 8, and the fourth switcher 12. The fourth switcher 12 is inserted among the first switcher 9, the second switcher 10, and the third switcher 11. Each of the switchers has a function of selecting and connecting two devices among the three devices.

Each of the first to third contactors 13 to 15 includes two connection ends and has a function of turning on and off connection between components connected to the two connection ends. The first contactor 13 is connected between a connecting unit 30 of the power storage device 6 and the converter 3 in the direct-current voltage section. The second contactor 14 is connected between the connecting unit 30 and the inverter 4. The third contactor 15 is connected between the connecting unit 30 and the auxiliary power supply device 7.

The sensors are explained. The current detector 22 detects, as a generator current IG, an electric current flowing between the generator 2 and the converter 3. The current detector 23 detects, as a motor current IM, an electric current flowing between the inverter 4 and the motor 5. The current detector 24 detects, as a battery current IB, an electric current flowing out from and flowing into the power storage device 6. The voltage detector 25 detects a voltage at a connection end of the converter 3 and the generator 2 as a generator voltage VG. The voltage detector 26 detects a voltage of the filter capacitor 20 as a first direct-current voltage EFCD. The voltage detector 27 detects a voltage of the filter capacitor 21 as a second direct-current voltage EFC. The rotation detector 28 detects the number of revolutions of the generator 2 as the number of generator revolutions FRG. The rotation detector 29 detects the number of revolutions of the motor 5 as the number of motor revolutions RN. Detection values (sensor information) detected by the sensors are input to the control unit 50.

In addition to the sensor information, state information STB representing a state of the power storage device 6 is input to the control unit 50. The state information includes an output voltage (a battery voltage) of the power storage device 6, information (SOC: State Of Charge) representing a charging (storage) state of the power storage device 6, and information (operation information) indicating whether the power storage device 6 is in a charged state or a discharged state.

Further, information (operation information) indicating operation content is input to the control unit 50. The operation information includes, for example, information indicating service operation (power running, braking, coasting, and stop) of an electric vehicle and information indicating electricity reception start operation of a vehicle system. Based on the sensor information (the generator current IG, the motor current IM, the battery current IB, the generator voltage VG, the first direct-current voltage EFCD, the second direct-current voltage EFC, the number of generator revolutions FRG, and the number of motor revolutions RN), the state information STB of the power storage device 6, and operation information CMD from the outside, the control unit 50 generates a gate signal GSC for controlling a switch element included in the converter 3, a gate signal GSI for controlling a switch element included in the inverter 4, and a gate signal GSS for controlling a switch element included in the auxiliary power supply device 7 and outputs the gate signals respectively to the converter 3, the inverter 4, and the auxiliary power supply device 7. Further, the control unit 50 generates a number of revolutions control signal RD for controlling the number of revolutions of the diesel engine 1 and outputs the number of revolutions control signal RD to the diesel engine 1. The control unit 50 generates a switching signal corresponding to a breakdown state explained below and outputs the switching signal to the first to fourth switchers 9 to 12 and the first to third contactors 13 to 15. In FIG. 1, to avoid complexity, illustration of the switching signal to the first to fourth switchers 9 to 12 and the first to third contactors 13 to 15 is omitted.

FIG. 3 is a table operation states of the diesel hybrid vehicle system and states of the first to fourth switchers and first to third contactors corresponding to the operation states. In FIG. 3, lower case alphabets shown in spaces of the first to fourth switchers 9 to 12 represent connection states of terminals shown in FIG. 2(a). For example, the notation of "a-b" means that the connection ends a and b are connected. "ON" and "OFF" shown in spaces of the first to third contactors 13 to 15 represent a conduction state of the first to third contactors. "ON" means that the first to third contactors are in the conduction state and "OFF" means that the first to third contactors are in a non-conduction state. A circle in an "engine start" space means that a diesel engine is concurrently used. A circle in a "charging from the generator" space means that the power storage device 6 is charged using generated power of the generator 2. Portions surrounded by thick-bordered boxes are provided to clearly show the switchers and the contactors in the same operation state. As shown in the figure, even if the switchers and the contactors are in the same operation state, a connection state of at least one of the first to fourth switchers is different (states of the first to third contactors are the same). A difference in operation due to a connection state of the first to fourth switchers is explained in detail below in explanation of operation of the embodiment.

Basic Operation

Figure 4:
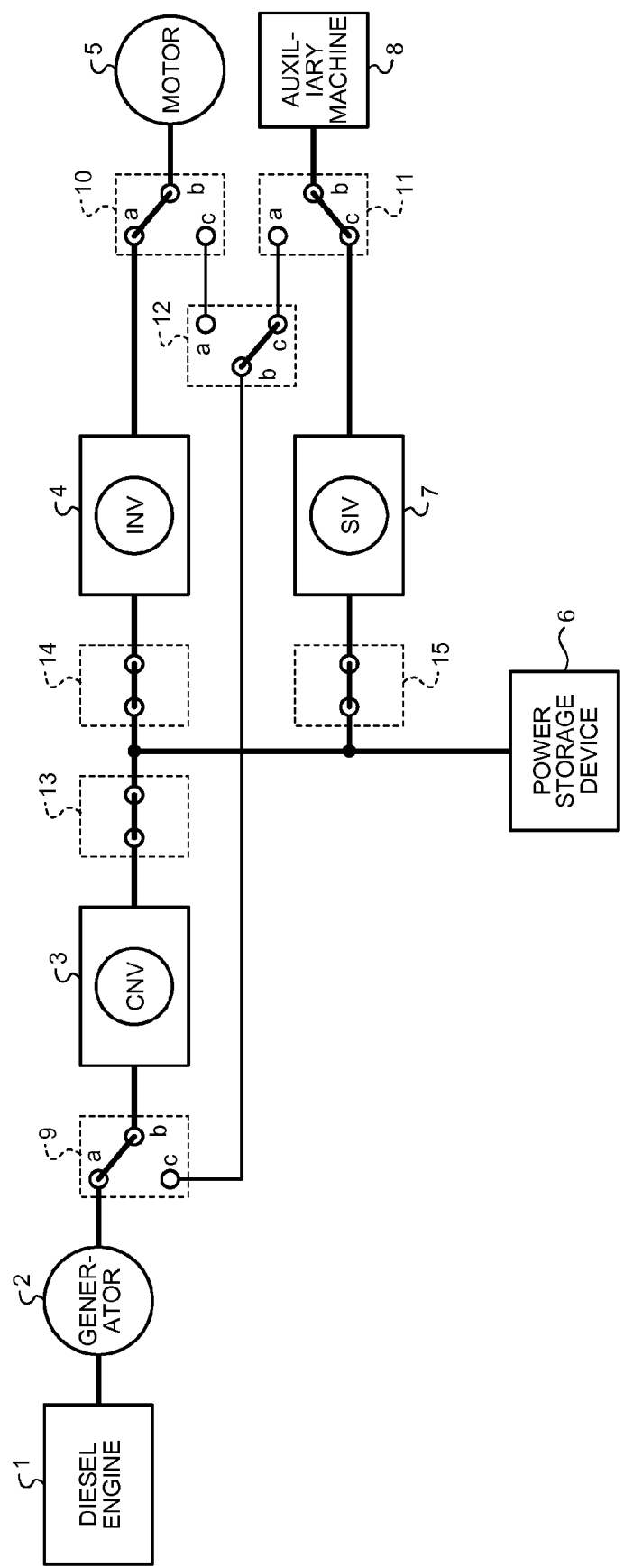
FIG. 4 is a diagram of a connection state of the diesel hybrid vehicle system at the time when all of a converter, an inverter, and an auxiliary power supply device are normal.

FIG. 4 is a diagram of a connection state of the diesel hybrid vehicle system at the time when all of the converter (CNV), the inverter (INV), and the auxiliary power supply device (SIV) are normal. A connection state of the first to fourth switchers and the first to third contactors controlled in a normal state (see No. 1 in FIG. 3) is shown. First, a basic operation of the diesel hybrid vehicle system is explained with reference to FIGS. 1 and 4. In the explanation of the basic operation, as an example, the diesel hybrid vehicle system mounted on a railway car travels between stations.

In the diesel hybrid vehicle system, as shown in FIG. 4, the connection ends a and b are connected in the first and second switchers 9 and 10, the connection ends b and c are connected in the third and fourth switches 11 and 12, and the first to third contactors 13 to 15 are controlled to ON. In FIG. 4, the connection ends b and c is connected in the fourth switcher 12. However, this connection is arbitrary (see No. 1 in FIG. 3). According to this control, the generator 2 and the converter 3 are connected, the converter 3 and the inverter 4 are connected, the inverter 4 and the motor 5 are connected, and the auxiliary power supply device 7 and the auxiliary machine 8 are connected. The power storage device 6 is connected to each of the converter 3, the inverter 4, and the auxiliary power supply device 7.

In such a connection state, when a power running command (one of the operation information CMD) is input from a not-shown motorman's cab to the control unit 50, the control unit 50 causes the inverter 4 to operate and controls the voltage amplitude and the frequency of alternating-current power supplied to the motor 5. The inverter 4 converts direct-current power supplied from the power storage device 6 into alternating-current power and supplies the alternating-current power to the motor 5. The motor 5 is driven, whereby a vehicle is started up to start power running. During the startup, an output of the diesel engine 1 is stopped.

When the speed of the vehicle reaches fixed speed (e.g., 20 km/h), the control unit 50 causes the converter 3 to operate as an inverter and controls the voltage amplitude and the frequency of alternating-current power supplied to the generator 2. The converter 3 operates as the inverter and converts the direct-current power supplied from the power storage device 6 into alternating-current power and supplies the alternating-current power to the generator 2, whereby the generator 2 operates as a motor.

When the generator 2 is driven, the diesel engine 1 starts. When the diesel engine 1 starts, the generator 2 operates as the original generator. When the diesel engine 1 starts and comes to generate an output necessary for the power running of the vehicle, the alternating-current power generated by the generator 2 is converted into direct-current power by the converter 3 and supplied to the inverter 4. At this point, the direct-current power discharged from the power storage device 6 decreases. An electric current (a discharge current) from the power storage device 6 stops flowing.

When the speed of the vehicle reaches predetermined speed, the power running command output from the not-shown motorman's cab to the control unit 50 is turned off. The control unit 50 stops the inverter 4. The vehicle changes to a coasting state.

The consumed power of the auxiliary machine 8 is supplied from the auxiliary power supply device 7. When the generator 2 is not generating the alternating-current power, electric power to the auxiliary power supply device 7 is supplied from the power storage device 6. On the other hand, when the generator 2 is generating the alternating-current power, the alternating-current power generated by the generator 2 is converted into direct-current power by the converter 3 and supplied to the auxiliary power supply device 7.

Thereafter, when a brake command is input from the not-shown motorman's cab to the control unit 50, the control unit 50 stops the converter 3 and stops the diesel engine 1 and the generator 2. The control unit 50 causes the motor 5 to operate as a generator by causing the inverter 4 to operate as a converter. At this point, the inverter 4 converts alternating-current power regenerated from the motor 5 into direct-current power, performs power supply necessary for the auxiliary power supply device 7, and charges the power storage device 6 making use of excess power.

It goes without saying that the abovementioned control by the control unit 50 is suitably performed based on the sensor information (the generator current IG, the motor current IM, the battery current IB, the generator voltage VG, the first direct-current voltage EFCD, the second direct-current voltage EFC, the number of generator revolutions FRG, and the number of motor revolutions RN) and the state information STB of the power storage device 6 input to the control unit 50.

Operation During a Breakdown of the Inverter

Figure 5:
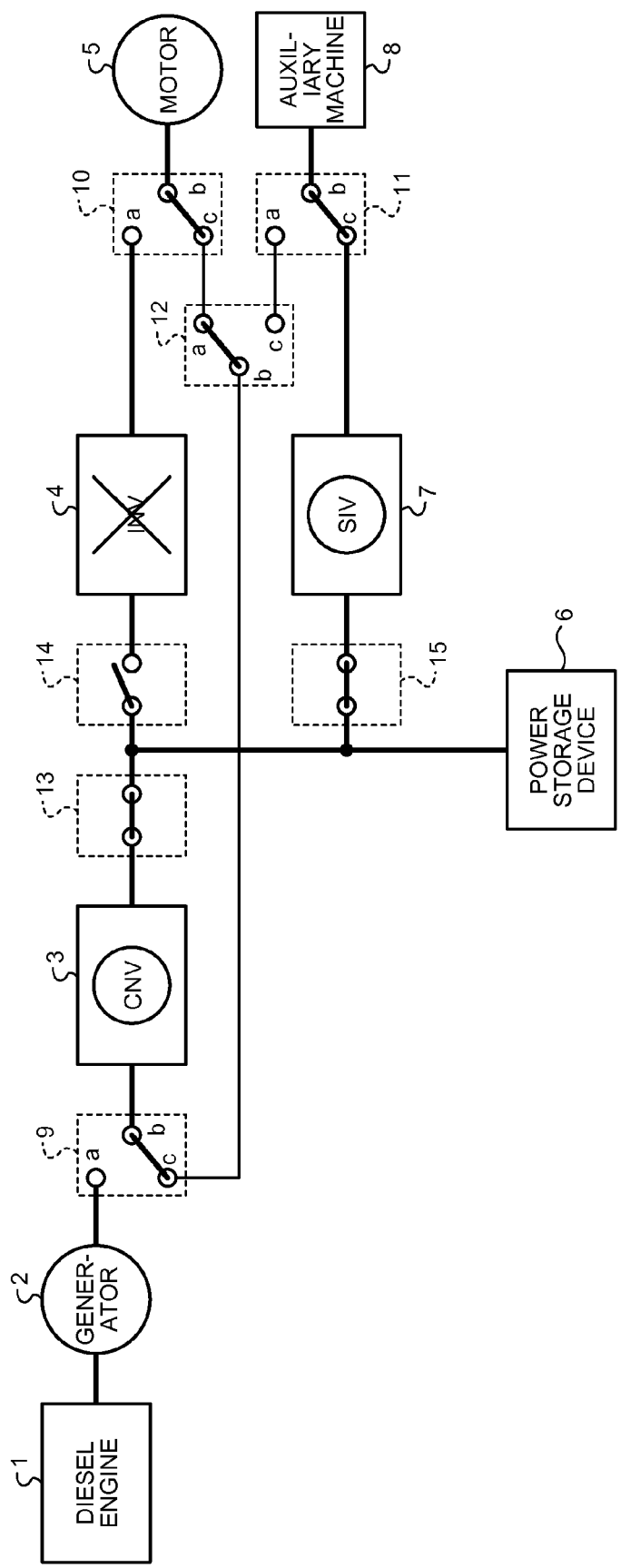
FIG. 5 is a diagram of a connection state of the diesel hybrid vehicle system during a breakdown of the inverter.

Operation during a breakdown of the inverter is explained with reference to FIG. 5. In FIG. 5, a circle mark affixed on the components, i.e., the converter (CNV) 3, the inverter (INV) 4, and the auxiliary power supply device (SIV) 7 means that the components are normal and a cross mark means that the components are abnormal (the same applies in FIG. 6 and subsequent figures).

First, during the breakdown of the inverter, for example, as shown in FIG. 5, the connection ends b and c are connected in the first to third switchers 9 to 11, the connection ends a and b are connected in the fourth switcher 12, the first and third contactors 13 and 15 are controlled to ON, and the second contactor 14 is controlled to OFF according to the control by the control unit 50 (see No. 2 in FIG. 3). According to this control, the generator 2 and the converter 3 are disconnected, the converter 3 and the inverter 4 are disconnected, the converter 3 and the motor 5 are connected, and the auxiliary power supply device 7 and the auxiliary machine 8 are connected. The power storage device 6 is connected to each of the converter 3 and the auxiliary power supply device 7.

When the diesel hybrid vehicle system is connected as shown in FIG. 5, the control unit 50 causes the converter 3 to operate as an inverter and converts the direct-current power supplied from the power storage device 6 into alternating-current power to drive the motor 5. Because the motor 5 is driven, it is possible to continue the service of the vehicle. Because the auxiliary machine 8 is connected to the power storage device 6 via the auxiliary power supply device 7, it is also possible to continue power supply to the auxiliary machine 8.

Figure 6:
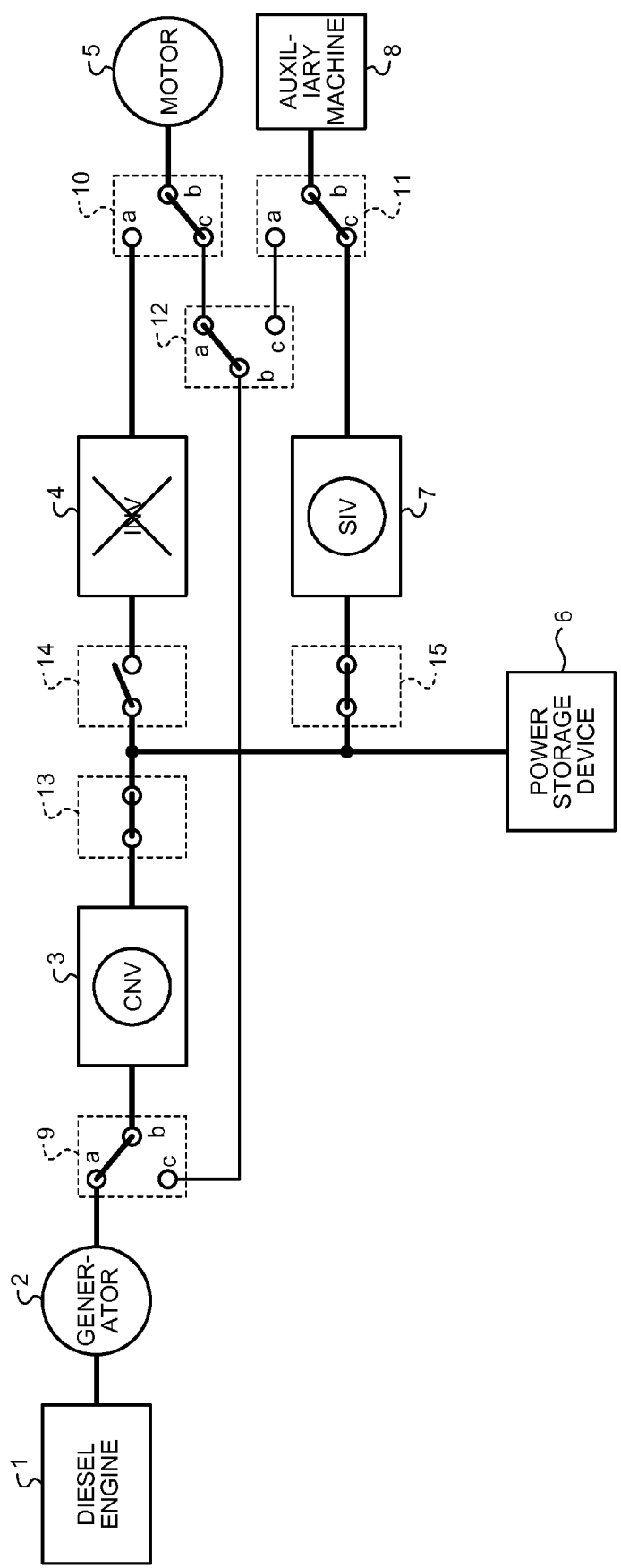
FIG. 6 is a diagram of a connection state different from the connection state shown in FIG. 5 of the diesel hybrid vehicle system during the breakdown of the inverter.

When discharge ability of the power storage device 6 decreases, the diesel hybrid vehicle system only has to be connected as shown in FIG. 6. In the case of FIG. 6, the connection ends a and b are connected in the first and fourth switchers 9 and 12, the connection ends b and c are connected in the second and third switchers 10 and 11, the first and third contactors 13 and 15 are controlled to ON, and the second contactor 14 is controlled to OFF (see No. 3 in FIG. 3). According to this control, the generator 2 and the converter 3 are connected, the converter 3 and the inverter 4 are disconnected, and the auxiliary power supply device 7 and the auxiliary machine 8 are connected. In other words, the motor 5 is disconnected from the power supply source. On the other hand, the power storage device 6 is connected to the generator 2 via the converter 3. The auxiliary machine 8 is connected to the power storage device 6 via the auxiliary power supply device 7.

Therefore, even if the discharge ability of the power storage device 6 decreases, it is possible to charge the power storage device 6 using the generated power of the generator 2. Because the auxiliary machine 8 is connected to the power storage device 6 via the auxiliary power supply device 7, it is possible to continue the power supply to the auxiliary machine 8.

Operation During a Breakdown of the Auxiliary Power Supply Device

Figure 7:
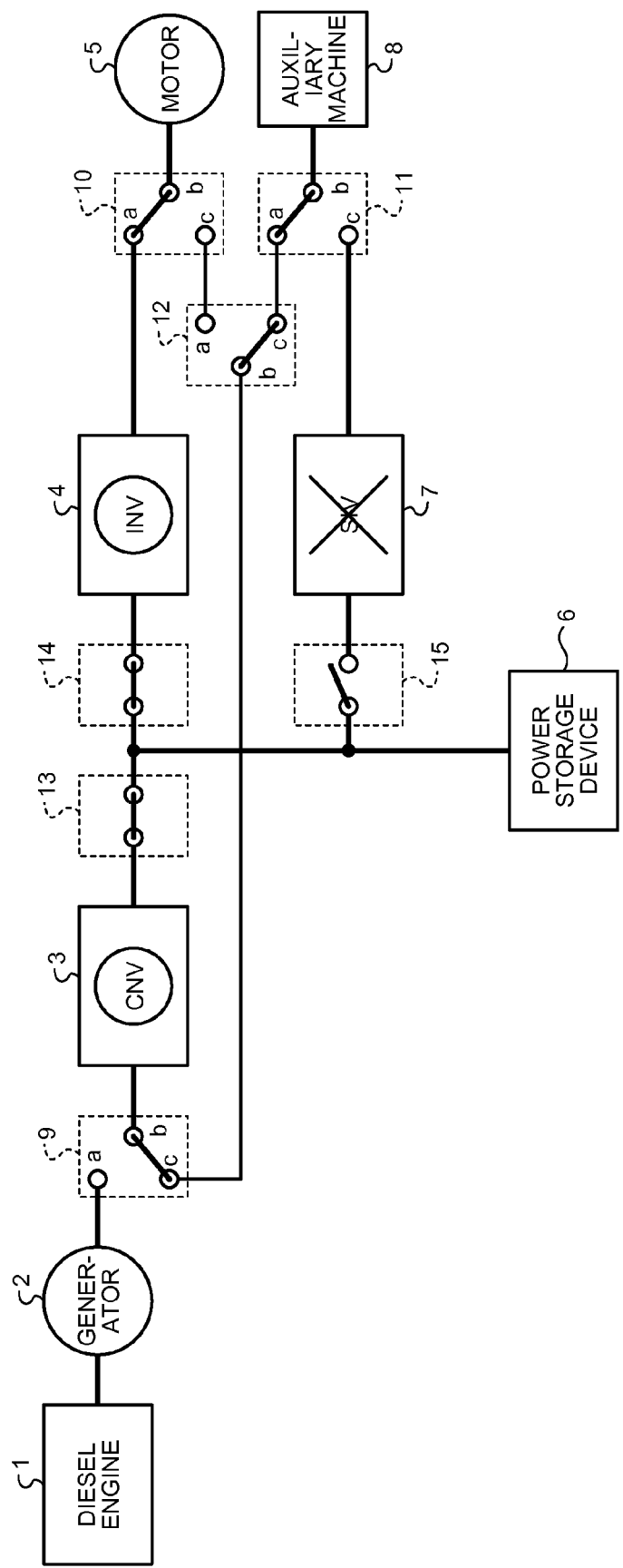
FIG. 7 is a diagram of a connection state of the diesel hybrid vehicle system during a breakdown of the auxiliary power supply device.

Operation during a breakdown of the auxiliary power supply device is explained. First, during the breakdown of the auxiliary power supply device, for example, as shown in FIG. 7, the connection ends b and c are connected in the first and fourth switchers 9 and 12, the connection ends a and b are connected in the second and third switchers 10 and 11, the first and second contactors 13 and 14 are controlled to ON, and the third contactor 15 is controlled to OFF according to the control by the control unit 50 (see No. 4 in FIG. 3). According to this control, the generator 2 and the converter 3 are disconnected, the inverter 4 and the motor 5 are connected, and the converter 3 and the auxiliary machine 8 are connected. The power storage device 6 is connected to each of the converter 3 and the inverter 4.

When the diesel hybrid vehicle system is connected as shown in FIG. 7, the control unit 50 causes the inverter 4 to operate and converts the direct-current power supplied from the power storage device 6 into alternating-current power to drive the motor 5. Because the motor 5 is driven, it is possible to continue the service of the vehicle.

The control unit 50 causes the converter 3 to operate as an inverter and converts the direct-current power supplied from the power storage device 6 into alternating-current power and supplies the alternating-current power to the auxiliary machine 8. Therefore, it is also possible to continue the power supply to the auxiliary machine 8.

Charging of the power storage device 6 can be performed making use of regenerative power of the motor 5. At this point, the inverter 4 operates as a converter.

Figure 8:
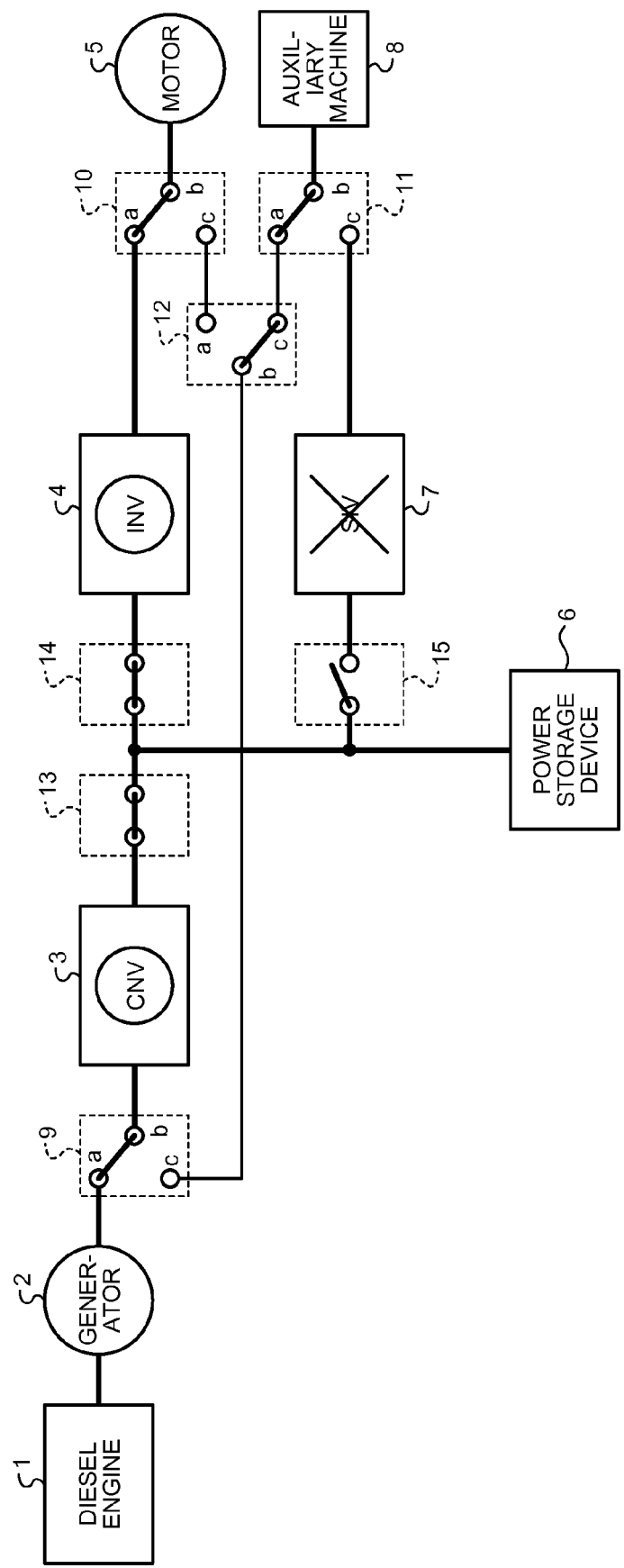
FIG. 8 is a diagram of a connection state different from the connection state shown in FIG. 7 of the diesel hybrid vehicle system during the breakdown of the auxiliary power supply device.

During the breakdown of the auxiliary power supply device, as shown in FIG. 8, the generator 2 and the converter 3 can be connected. In the case of FIG. 8, the connection ends a and b are connected in the first to third switchers 9 to 11, the connection ends b and c are connected in the fourth switcher 12, the first and second contactors 13 and 14 are controlled to ON, and the third contactor 15 is controlled to OFF (see No. 5 in FIG. 3). According to this control, the generator 2 and the converter 3 are connected, the converter 3 and the inverter 4 are connected, and the inverter 4 and the motor 5 are connected. The power storage device 6 is connected to the generator 2 via the converter 3.

Therefore, if the converter 3 and the inverter 4 are caused to operate, it is possible to drive the motor 5 using the generated power of the generator 2 and continue the service of the vehicle.

When the discharge ability of the power storage device 6 decreases, it is possible to charge the power storage device 6 using the generated power of the generator 2.

When the regenerative power of the motor 5 can be used, it is possible to charge the power storage device 6 by causing the inverter 4 to operate as a converter.

Operation During a Breakdown of the Converter

Figure 9:
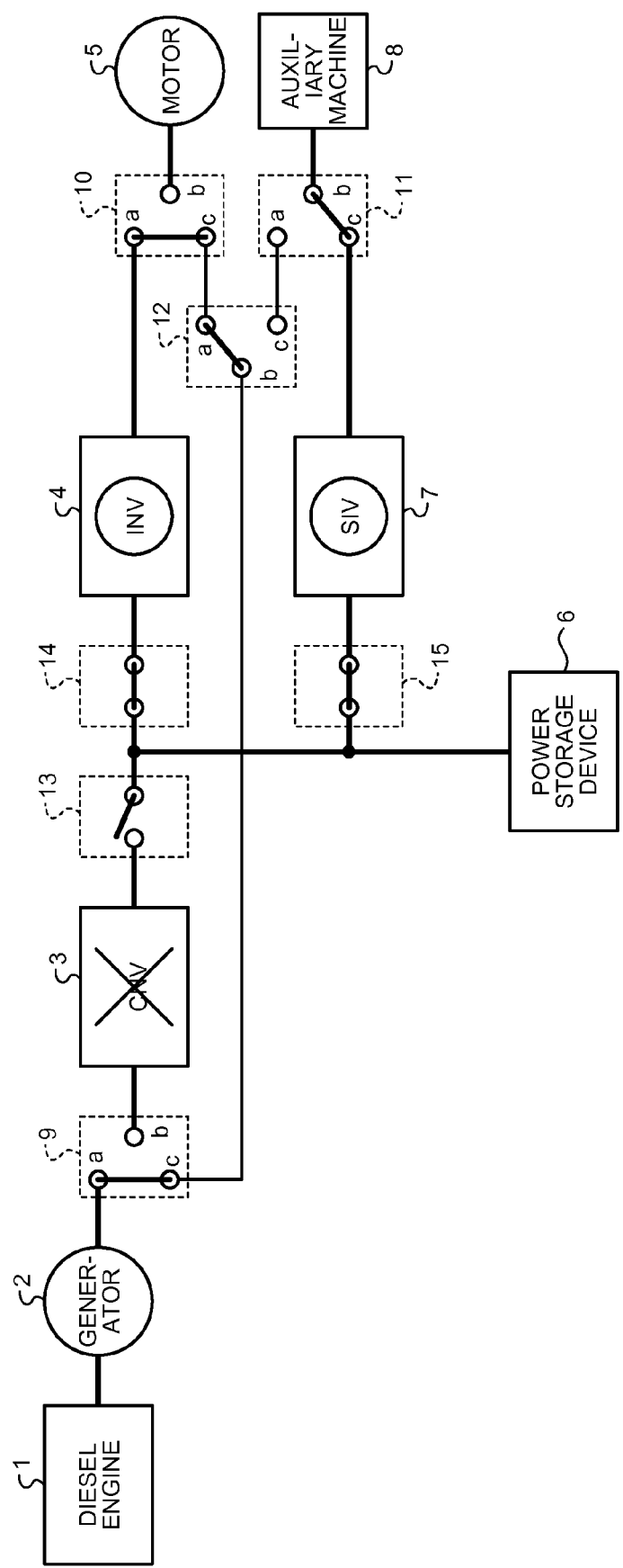
FIG. 9 is a diagram of a connection state of the diesel hybrid vehicle system during a breakdown of the converter.

Operation during a breakdown of the converter is explained. First, during the breakdown of the converter, for example, as shown in FIG. 9, the connection ends a and c are connected in the first and second switchers 9 and 10, the connection ends b and c are connected in the third switcher 11, the connection ends a and b are connected in the fourth switcher 12, the first contactor 13 is controlled to OFF, and the second and third contactors 14 and 15 are controlled to ON according to the control by the control unit 50 (see No. 6 in FIG. 3). According to this control, the generator 2 and the converter 3 are disconnected and the inverter 4 and the motor 5 are also disconnected. On the other hand, the power storage device 6 is connected to the generator 2 via the inverter 4. The auxiliary machine 8 is connected to the power storage device 6 via the auxiliary power supply device 7.

When the diesel hybrid vehicle system is connected as shown in FIG. 9, the control unit 50 causes the inverter 4 to operate as a converter, converts the alternating-current power supplied from the generator 2 into direct-current power, performs power supply necessary for the auxiliary power supply device 7, and charges the power storage device 6 making use of excess power. Therefore, it is possible to supply electric power to the auxiliary machine 8.

Figure 10:
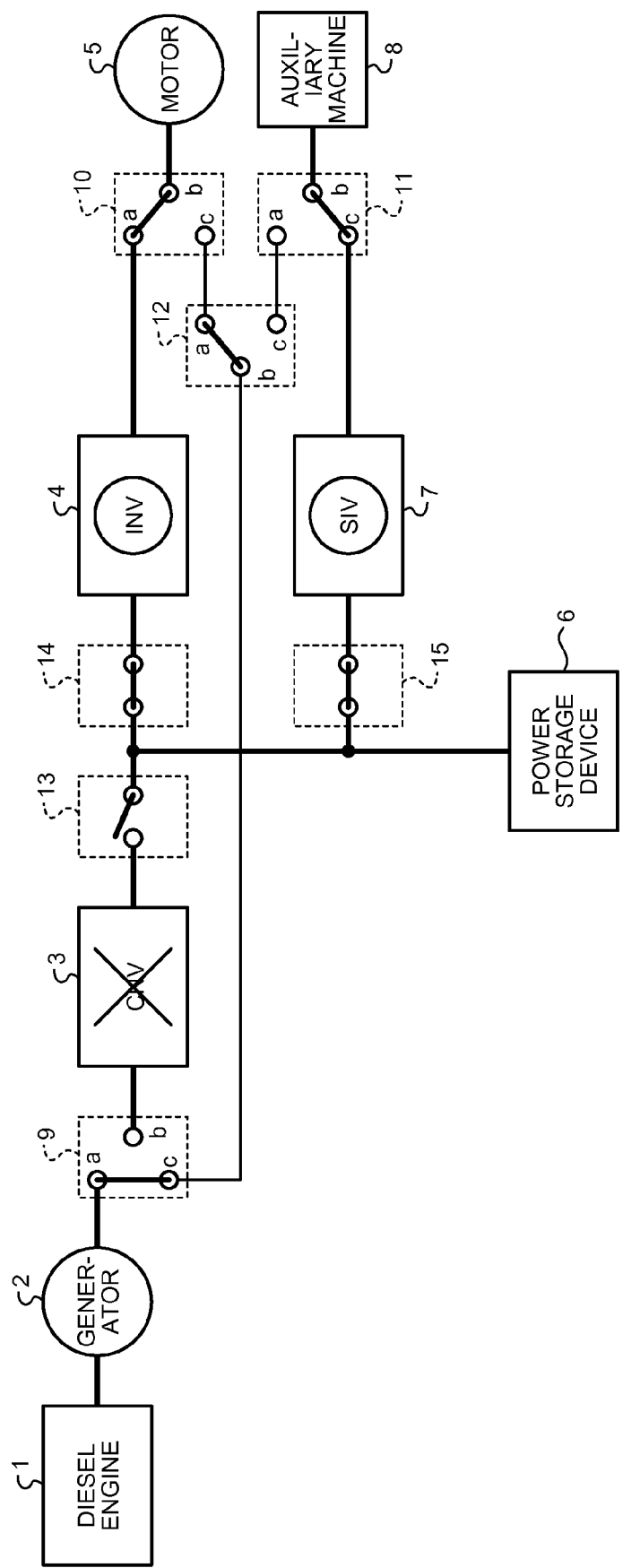
FIG. 10 is a diagram of a connection state different from the connection state shown in FIG. 9 of the diesel hybrid vehicle system during the breakdown of the converter.

During the breakdown of the converter, if the diesel hybrid vehicle system is connected as shown in FIG. 10, it is possible to supply electric power to the motor 5 and the auxiliary machine 8. In the case of FIG. 10, the connection ends a and c are connected in the first switcher 9, the connection ends a and b are connected in the second and fourth switches 10 and 12, the connection ends b and c are connected in the third switcher 11, the first contactor 13 is controlled to OFF, and the second and third contactors 14 and 15 are controlled to ON (see No. 7 in FIG. 3). According to this control, the generator 2 is disconnected from the motor 5. However, the inverter 4 and the motor 5 are connected and the auxiliary machine 8 is connected to the power storage device 6 via the auxiliary power supply device 7.

Therefore, if the inverter 4 is caused to operate, it is possible to drive the motor 5 using the direct-current power of the power storage device 6 and continue the service of the vehicle.

Because the auxiliary machine 8 is also connected to the power storage device 6 via the auxiliary power supply device 7, it is also possible to supply electric power to the auxiliary machine 8.

Operation During Breakdowns of the Converter and the Inverter

Figure 11:
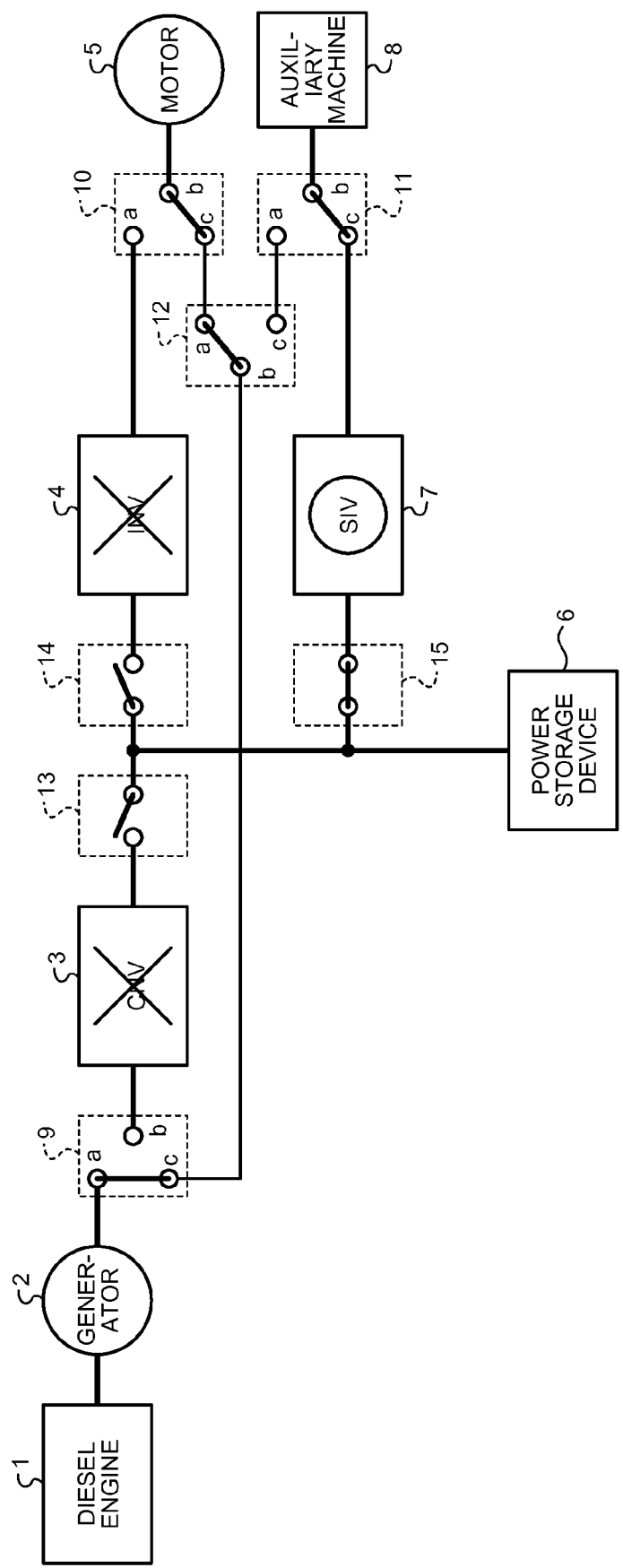
FIG. 11 is a diagram of a connection state of the diesel hybrid vehicle during breakdowns of the converter and the inverter.

Operation during breakdowns of the converter and the inverter is explained. During the breakdowns, for example, as shown in FIG. 11, the connection ends a and c are connected in the first switcher 9, the connection ends b and c are connected in the second and third switchers 10 and 11, the connection ends a and b are connected in the fourth switcher 12, the first and second contactors 13 and 14 are controlled to OFF, and the third contactor 15 is controlled to ON according to the control by the control unit 50 (see No. 8 in FIG. 3). According to this control, the generator 2 and the converter 3 are disconnected, the inverter 4 and the motor 5 are also disconnected, and the converter 3 and the inverter 4 are disconnected from the power storage device 6 as well. On the other hand, the motor 5 is connected to the generator 2 and the auxiliary machine 8 is connected to the power storage device 6 via the auxiliary power supply device 7.

When the diesel hybrid vehicle system is connected as shown in FIG. 11, it is possible to start the diesel engine 1 by supplying the regenerative power of the motor 5 to the generator 2. When the diesel engine 1 starts and comes to generate an output necessary for the power running of the vehicle, it is possible to drive the motor 5 and continue the service of the vehicle by controlling the number of revolutions of the diesel engine 1 to control the alternating-current power from the generator 2 to desired alternating-current power and supplying the alternating-current power to the motor 5.

Figure 12:
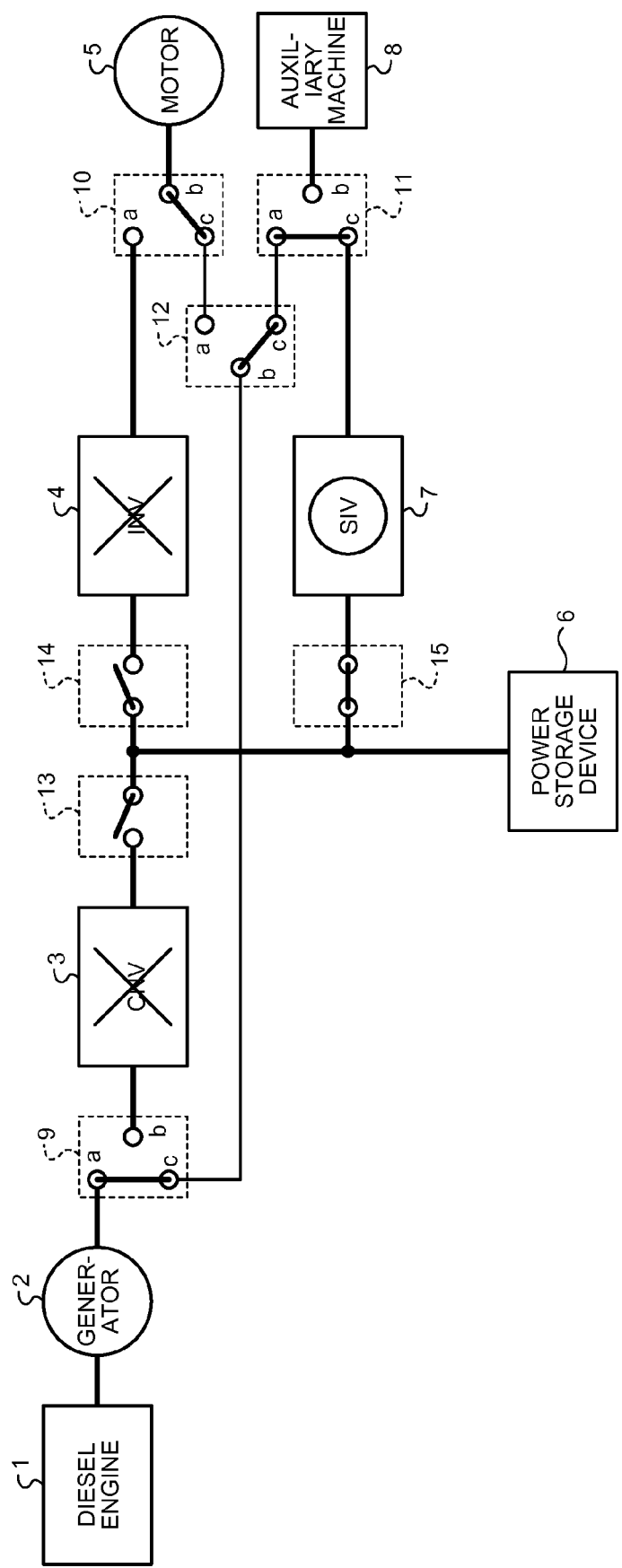
FIG. 12 is a diagram of a connection state different from the connection state shown in FIG. 11 of the diesel hybrid vehicle system during the breakdowns of the converter and the inverter.

During the breakdowns of the converter and the inverter, if the diesel hybrid vehicle system is connected as shown in FIG. 12, it is possible to charge the power storage device 6. In the case of FIG. 12, connection ends a and c are connected in the first and third switchers 9 and 11, the connection ends b and c are connected in the second and fourth switchers 10 and 12, the first and second contactors 13 and 14 are controlled to OFF, and the third contactor 15 is controlled to ON (see No. 9 in FIG. 3). According to this control, the generator 2 is disconnected from the motor 5 but is connected to the power storage device 6 via the auxiliary power supply device 7.

Therefore, if the auxiliary power supply device 7 is caused to operate as a converter, it is possible to charge the power storage device 6 using the generated power of the generator 2. Conversely to this control, if the auxiliary power supply device 7 is caused to operate as a normal inverter and the generator 2 is caused to operate as a motor by converting the direct-current power supplied from the power storage device 6 into alternating-current power and supplying the alternating-current power to the generator 2, it is possible to start the diesel engine 1 in advance.

Figure 13:
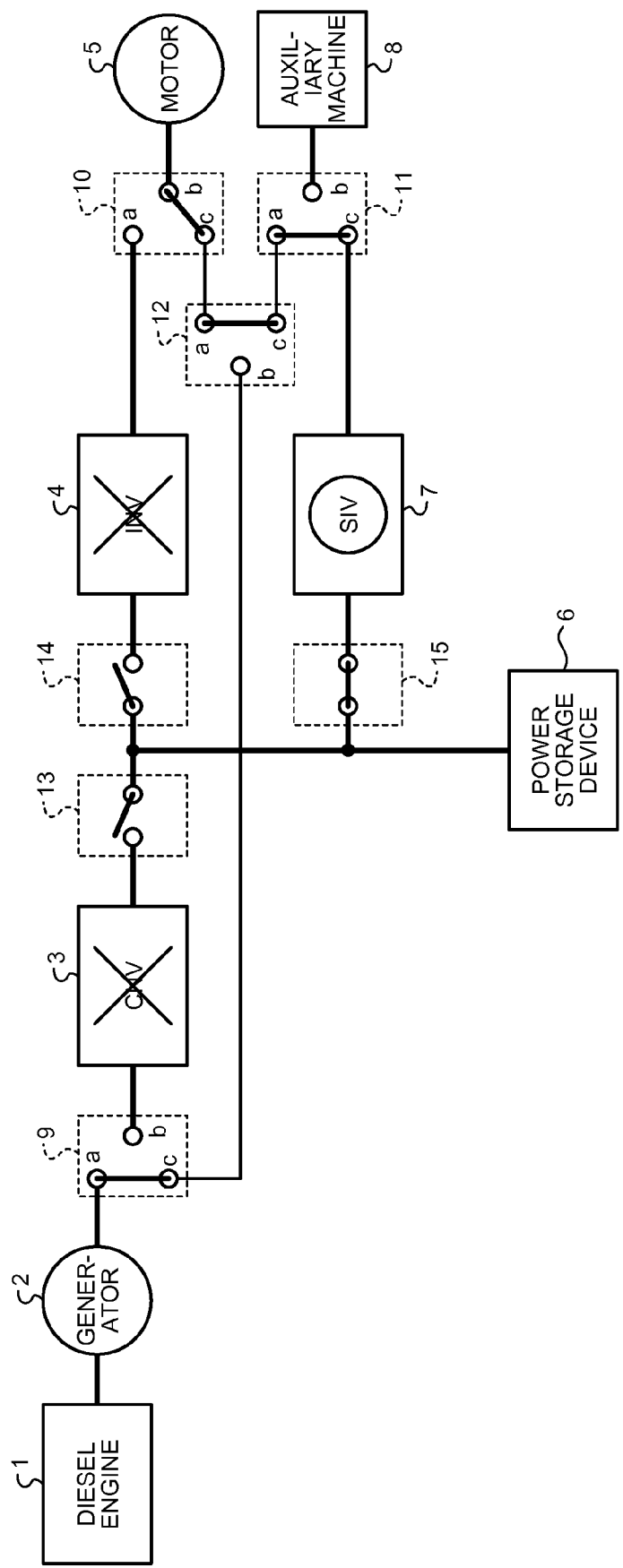
FIG. 13 is a diagram of a connection state different from the connection states shown in FIGS. 11 and 12 of the diesel hybrid vehicle system during the breakdowns of the converter and the inverter.

During the breakdowns of the converter and the inverter, the diesel hybrid vehicle system can be connected as shown in FIG. 13. In the case of FIG. 13, the connection ends a and c are connected in the first, third, and fourth switchers 9, 11, and 12, the connection ends b and c are connected in the second switcher 10, the first and second contactors 13 and 14 are controlled to OFF, and the third contactor 15 is controlled to ON (see No. 10 in FIG. 3). According to this control, the generator 2 is disconnected from the motor 5. However, the motor 5 is connected to the power storage device 6 via the auxiliary power supply device 7.

Therefore, if the auxiliary power supply device 7 is caused to operate, it is possible to drive the motor 5 using the direct-current power of the power storage device 6 and continue the service of the vehicle.

Figure 14:
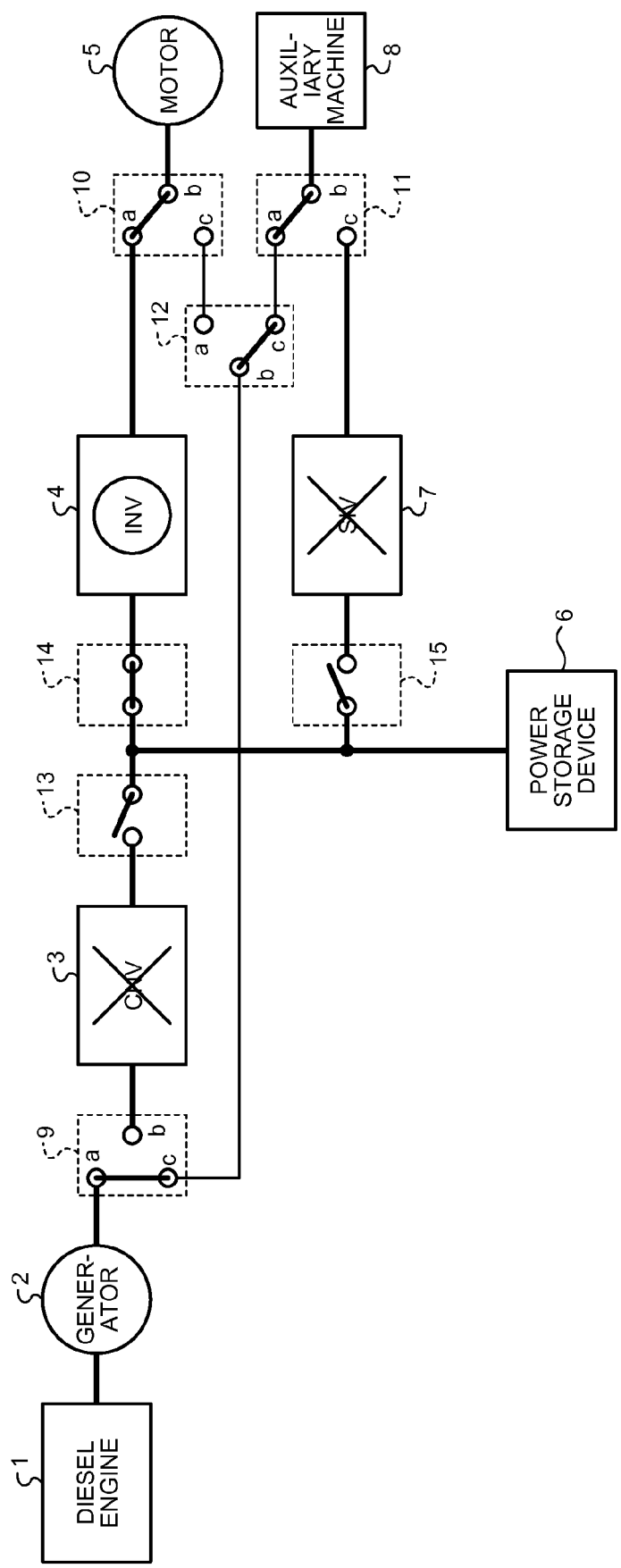
FIG. 14 is a diagram of a connection state of the diesel hybrid vehicle system during breakdowns of the converter and the auxiliary power supply device.

Operation During Breakdowns of the Converter and the Auxiliary Power Supply Device Operation during breakdowns of the converter and the auxiliary power supply device is explained. During the breakdowns, for example, as shown in FIG. 14, the connection ends a and c are connected in the first switcher 9, the connection ends a and b are connected in the second and third switchers 10 and 11, the connection ends b and c are connected in the fourth switcher 12, the first and third contactors 13 and 15 are controlled to OFF, and the second contactor 14 is controlled to ON according to the control by the control unit 50 (see No. 11 in FIG. 3). According to this control, the converter 3 is disconnected from the generator 2, the inverter 4, and the power storage device 6 and the auxiliary power supply device 7 is disconnected from the converter 3, the inverter 4, and the power storage device 6. On the other hand, the motor 5 is connected to the inverter 4 and the auxiliary machine 8 is connected to the generator 2.

When the diesel hybrid vehicle system is connected as shown in FIG. 14, if the inverter 4 is caused to operate, it is possible to drive the motor 5 using the direct-current power of the power storage device 6 and continue the service of the vehicle.

When the diesel engine 1 is started up, it is possible to supply the alternating-current power from the generator 2 to the auxiliary machine 8. Therefore, it is possible to supply electric power to the auxiliary machine 8.

Figure 15:
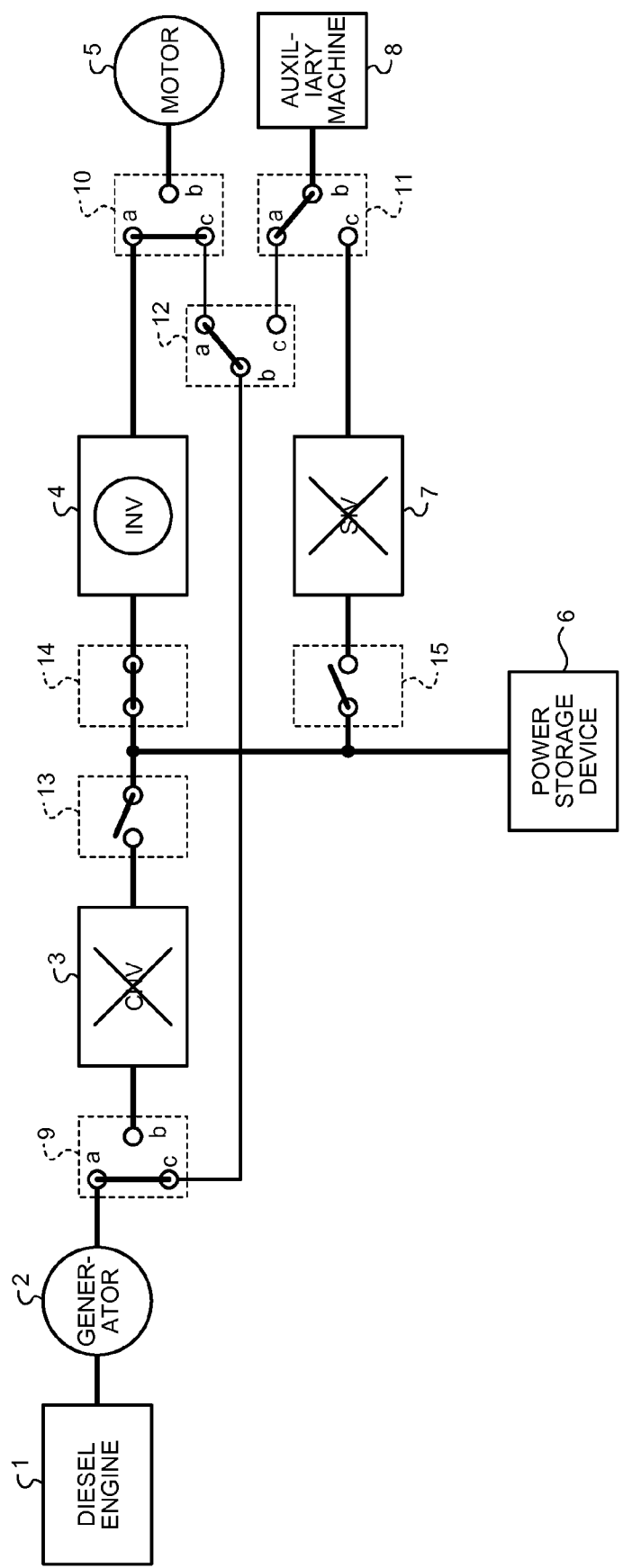
FIG. 15 is a diagram of a connection state different from the connection state shown in FIG. 14 of the diesel hybrid vehicle system during the breakdowns of the converter and the auxiliary power supply device.

During the breakdowns of the converter and the auxiliary power supply device, if the diesel hybrid vehicle system is connected as shown in FIG. 15, it is possible to charge the power storage device 6. In the case of FIG. 15, the connection ends a and c are connected in the first and second switchers 9 and 10, the connection ends a and b are connected in the third and fourth switchers 11 and 12, the first and third contactors 13 and 15 are controlled to OFF, and the second contactor 14 is controlled to ON (see No. 12 in FIG. 3). According to this control, the generator 2 is connected to the power storage device 6 via the inverter 4.

Therefore, if the inverter 4 is caused to operate as a converter, it is possible to charge the power storage device 6 using the generated power of the generator 2.

Figure 16:
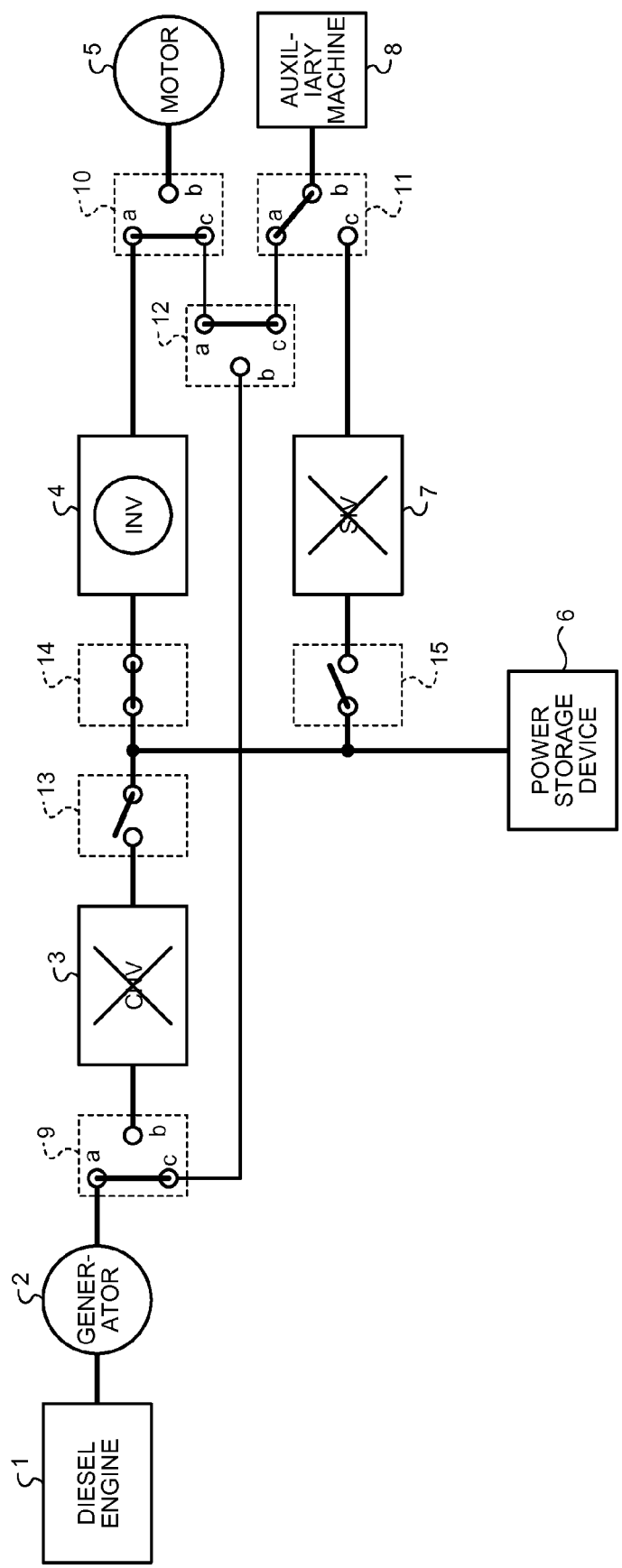
FIG. 16 is a diagram of a connection state different from the connection states shown in FIGS. 14 and 15 of the diesel hybrid vehicle system during the breakdowns of the converter and the auxiliary power supply device.

During the breakdowns of the converter and the auxiliary power supply device, if the diesel hybrid vehicle system is connected as shown in FIG. 16, it is possible to supply electric power to the auxiliary machine 8. In the case of FIG. 16, the connection ends a and c are connected in the first, second, and fourth switchers 9, 10, and 12, the connection ends a and b are connected in the third switcher 11, the first and third contactors 13 and 15 are controlled to OFF, and the second contactor 14 is controlled to ON (see No. 13 in FIG. 3). According to this control, the inverter 4 is connected to the auxiliary machine 8.

Therefore, if the inverter 4 is caused to operate, it is possible to supply alternating-current power to the auxiliary machine 8 using the direct-current power of the power storage device 6. Therefore, it is possible to supply electric power to the auxiliary machine 8.

Figure 17:
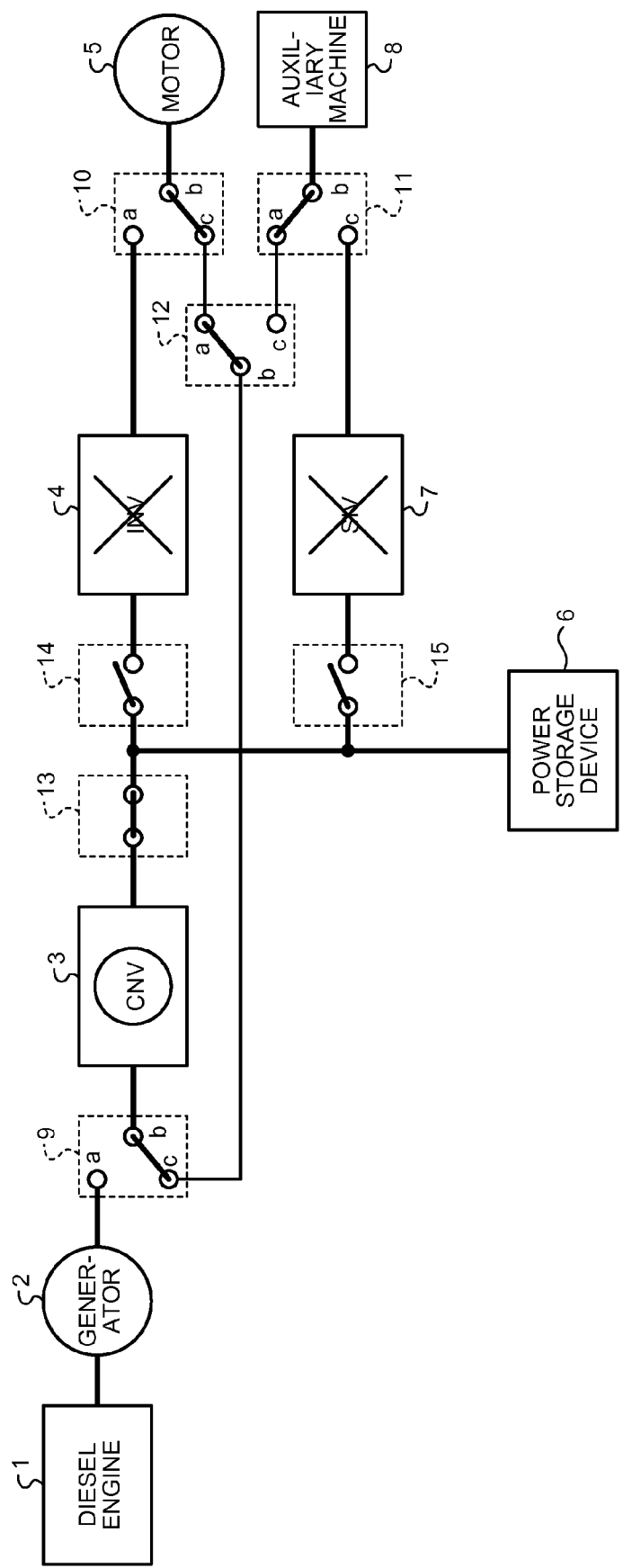
FIG. 17 is a diagram of a connection state of the diesel hybrid vehicle system during breakdowns of the inverter and the auxiliary power supply device.

Operation During Breakdowns of the Inverter and the Auxiliary Power Supply Device Operation during breakdowns of the inverter and the auxiliary power supply device is explained. During the breakdowns, for example, as shown in FIG. 17, the connection ends b and c are connected in the first and second switchers 9 and 10, the connection ends a and b are connected in the third and fourth switchers 11 and 12, the first contactor 13 is controlled to ON, and the second and third contactors 14 and 15 are controlled to OFF according to the control by the control unit 50 (see FIG. 14 in FIG. 3). According to this control, the inverter 4 is disconnected from the converter 3 and the power storage device 6 and the auxiliary power supply device 7 is disconnected from the converter 3 and the power storage device 6. On the other hand, the motor 5 is connected to the converter 3.

When the diesel hybrid vehicle system is connected as shown in FIG. 17, if the converter 3 is caused to operate as an inverter, it is possible to drive the motor 5 using the direct-current power of the power storage device 6 and continue the service of the vehicle.

Figure 18:
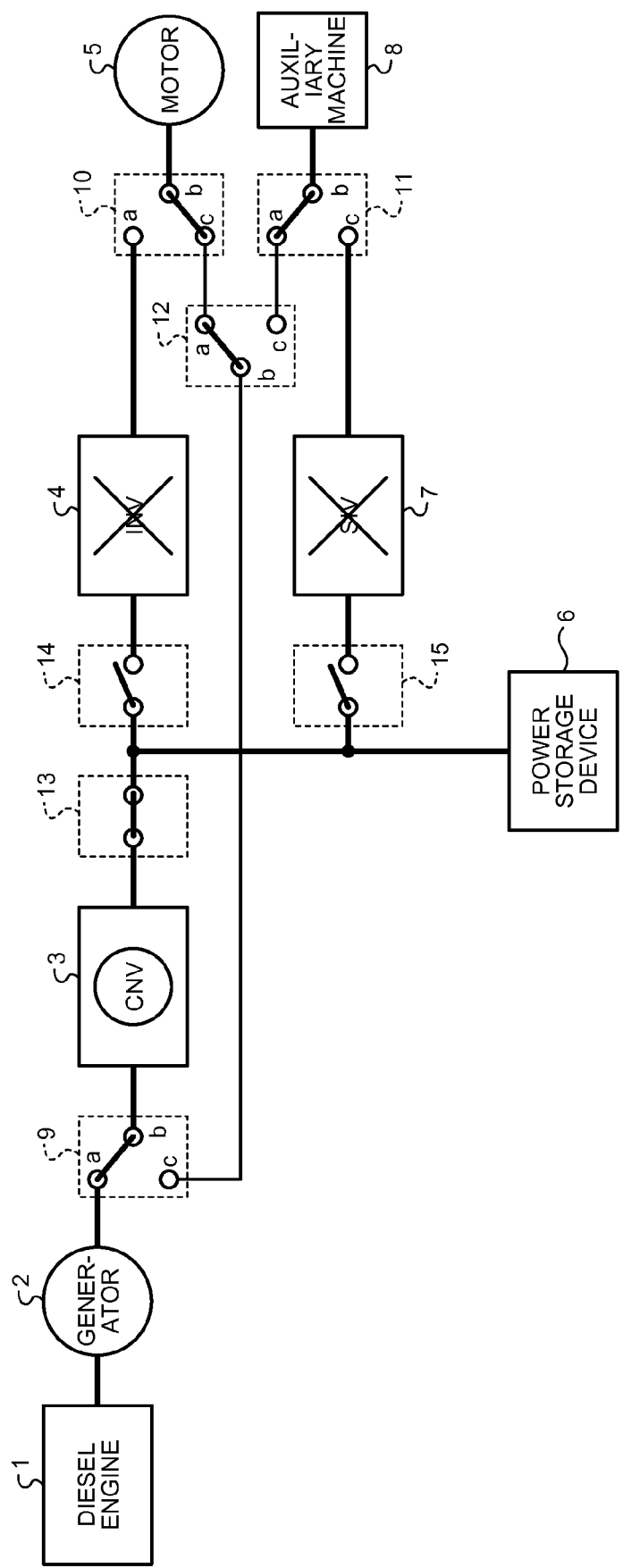
FIG. 18 is a diagram of a connection state different from the connection state shown in FIG. 17 of the diesel hybrid vehicle system during the breakdowns of the inverter and the auxiliary power supply device.

During the breakdowns of the inverter and the auxiliary power supply device, if the diesel hybrid vehicle system is connected as shown in FIG. 18, it is possible to charge the power storage device 6. In the case of FIG. 18, the connection ends a and b are connected in the first, third, and fourth switchers 9, 11, and 12, the connection ends b and c are connected in the second switcher 10, the first contactor 13 is controlled to ON, and the second and third contactors 14 and 15 are controlled to OFF (see No. 15 in FIG. 3). According to this control, the generator 2 is connected to the power storage device 6 via the converter 3.

Therefore, if the converter 3 is caused to operate, it is possible to charge the power storage device 6 using the generated power of the generator 2.

Figure 19:
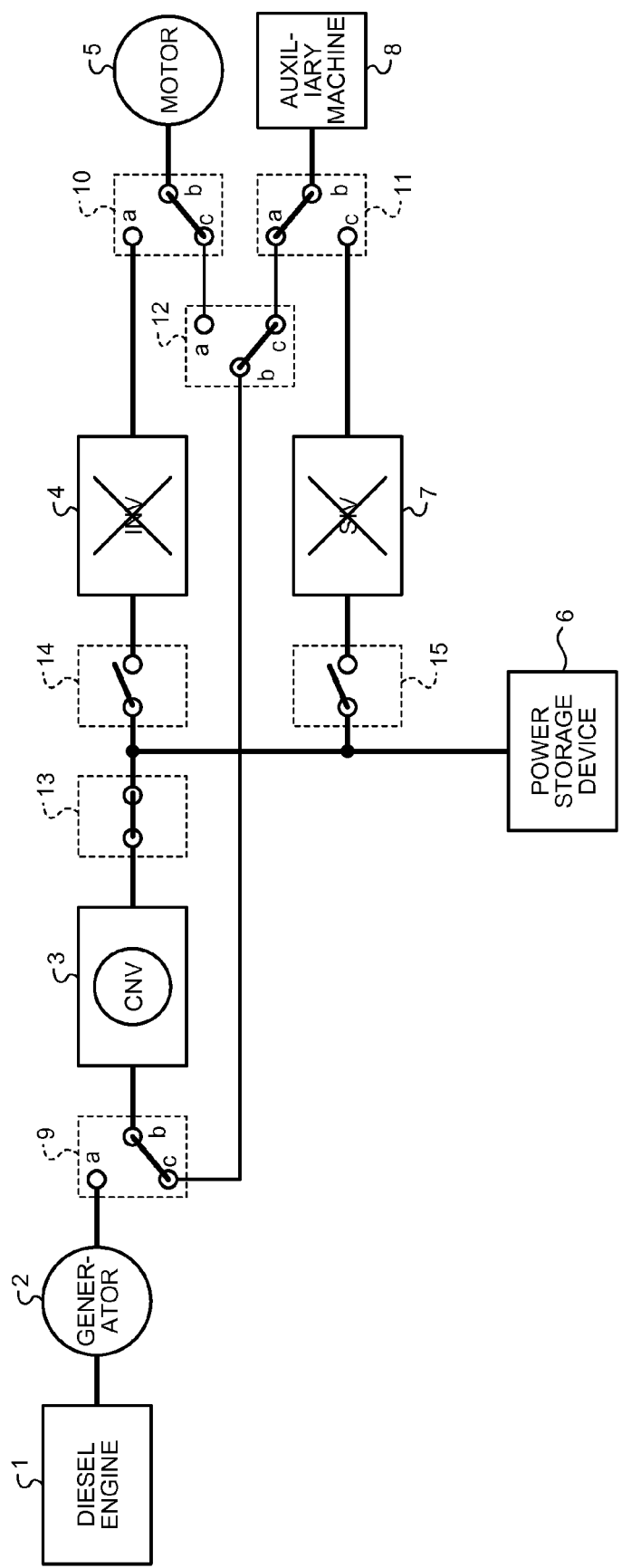
FIG. 19 is a diagram of a connection state different from the connection states shown in FIGS. 17 and 18 of the diesel hybrid vehicle system during the breakdowns of the inverter and the auxiliary power supply device.

During the breakdowns of the converter and the auxiliary power supply device, if the diesel hybrid vehicle system is connected as shown in FIG. 19, it is possible to supply electric power to the auxiliary machine 8. In the case of FIG. 19, the connection ends b and c are connected in the first, second, and fourth switchers 9, 10, and 12, the connection ends a and b are connected in the third switcher 11, the first contactor 13 is controlled to ON, and the second and third contactors 14 and 15 are controlled to OFF (see No. 16 in FIG. 3). According to this control, the converter 3 is connected to the auxiliary machine 8.

Therefore, if the converter 3 is caused to operate as an inverter, it is possible to supply alternating-current power to the auxiliary machine 8 using the direct-current power of the power storage device 6. Therefore, it is possible to supply electric power to the auxiliary machine 8.

Figure 20:
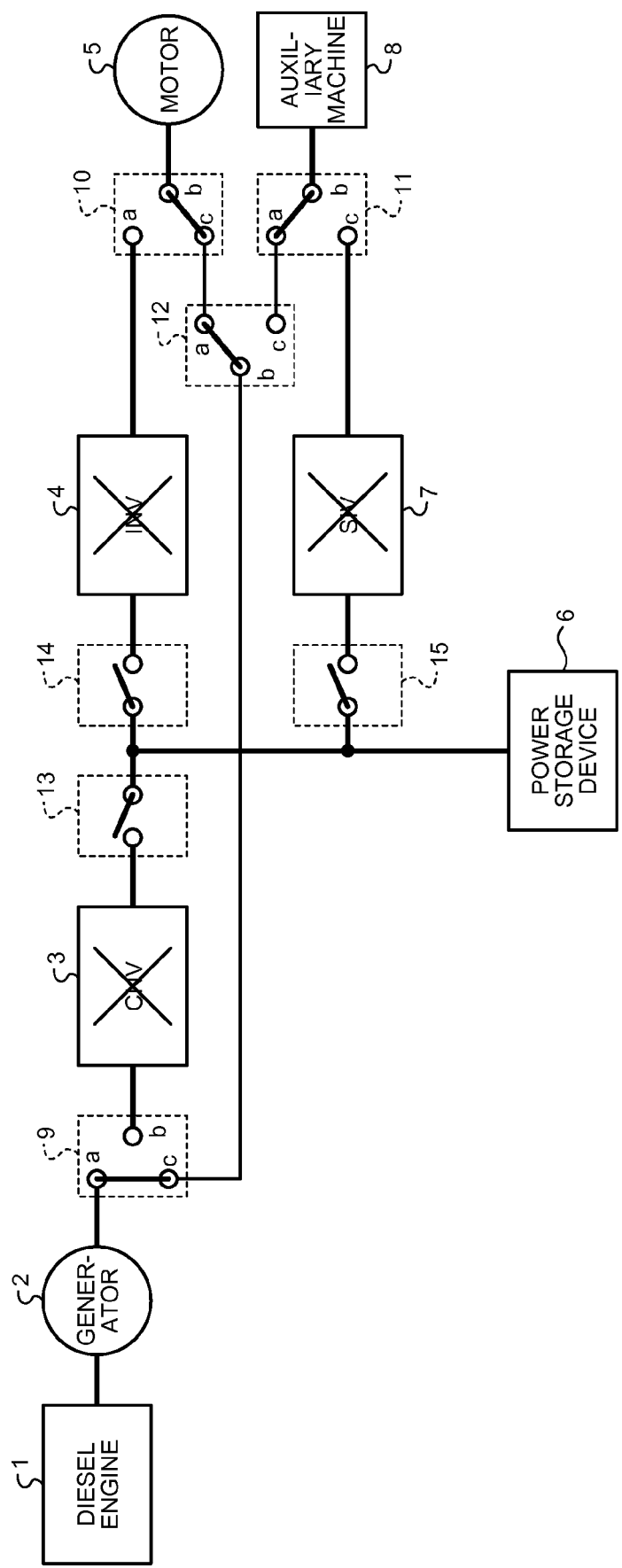
FIG. 20 is a diagram of a connection state of the diesel hybrid vehicle system during breakdowns of the converter, the inverter, and the auxiliary power supply device.

Operation During Breakdowns of the Converter, the Inverter, and the Auxiliary Power Supply Device Operation during breakdowns of the converter, the inverter, and the auxiliary power supply device is explained. During the breakdowns, for example, as shown in FIG. 20, the connection ends a and c are connected in the first switcher 9, the connection ends b and c are connected in the second switcher 10, the connection ends a and b are connected in the third and fourth switchers 11 and 12, and all the first to third contactors 13 to 15 are controlled to OFF according to the control by the control unit 50 (see FIG. 17 in FIG. 3). According to this control, the converter 3 is disconnected from the generator 2 and the power storage device 6, the inverter 4 is disconnected from the motor 5 and the power storage device 6, and the auxiliary power supply device 7 is disconnected from the converter 3, the inverter 4, and the power storage device 6. On the other hand, the motor 5 is connected to the generator 2.

When the diesel hybrid vehicle system is connected as shown in FIG. 20, if the diesel engine 1 is started up, it is possible to drive the motor 5 and continue the service of the vehicle by controlling the number of revolutions of the diesel engine 1 to control the alternating-current power from the generator 2 to desired alternating-current power and supplying the alternating-current power to the motor 5.

Figure 21:
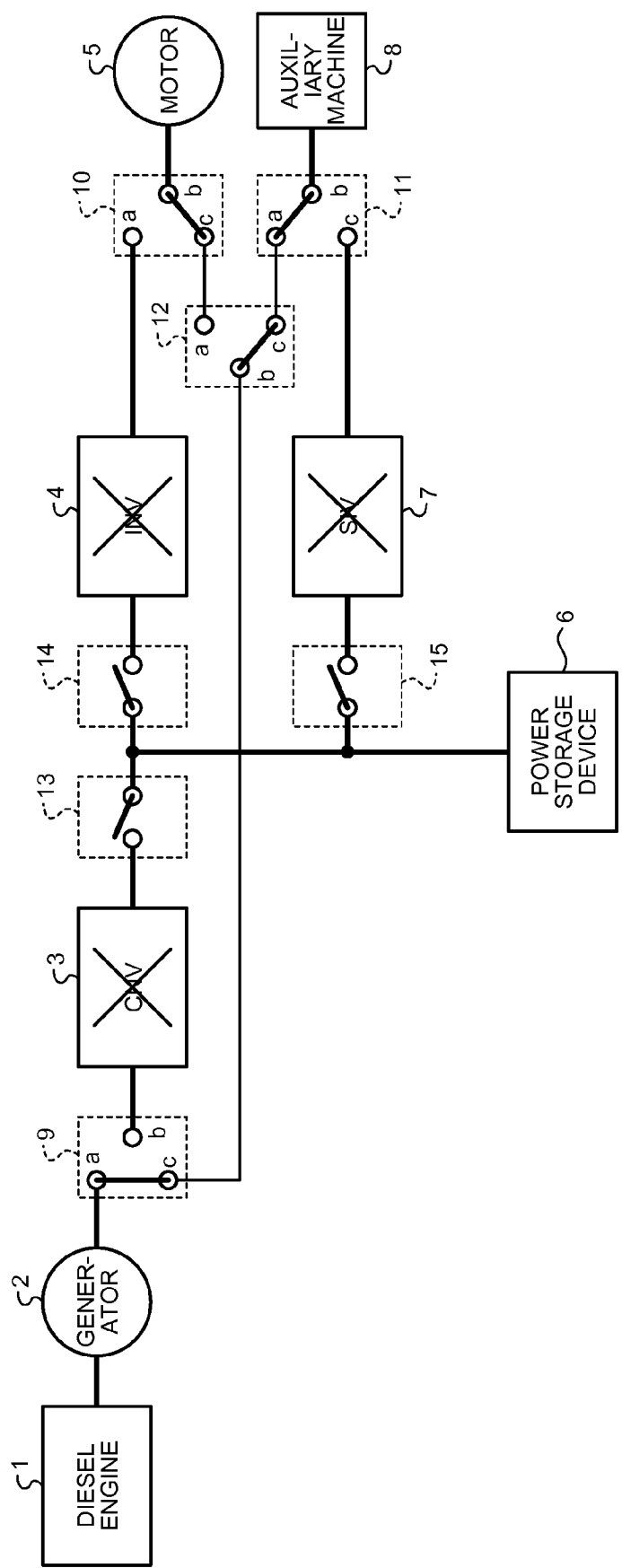
FIG. 21 is a diagram of a connection state different from the connection state shown in FIG. 20 of the diesel hybrid vehicle system during the breakdowns of the converter, the inverter, and the auxiliary power supply device.

During the breakdowns of the converter, the inverter, and the auxiliary power supply device, if the diesel hybrid vehicle system is connected as shown in FIG. 21, it is possible to supply electric power to the auxiliary machine 8. In the case of FIG. 21, the connection ends a and c are connected in the first switcher 9, the connection ends b and c are connected in the second and fourth switchers 10 and 12, the connection ends a and b are connected in the third switcher 11, and all the first to third contactors 13 to 15 are controlled to OFF (see No. 18 in FIG. 3). According to this control, the auxiliary machine 8 is connected to the generator 2.

When the diesel hybrid vehicle system is connected as shown in FIG. 21, if the diesel engine 1 is started up, it is possible to control the number of revolutions of the diesel engine 1 to control the alternating-current power from the generator 2 to desired alternating-current power and supply the alternating-current power to the auxiliary machine 8. Therefore, it is possible to supply electric power to the auxiliary machine 8.

When all of the converter, the inverter, and the auxiliary power supply device are broken down, the diesel engine 1 cannot be restarted. Therefore, for example, when any two regions among the converter 3, the inverter 4, and the auxiliary power supply device 7 are broken down, it is desirable to once control the diesel hybrid vehicle system to the connection state shown in FIGS. 12, 15, and 18 according to the broken-down regions and restart the diesel engine 1. If such control is performed, thereafter, even if all of the converter 3, the inverter 4, and the auxiliary power supply device 7 are broken down, it is possible to supply electric power from the generator 2 to the motor 5 and the auxiliary machine 8. Therefore, it is possible to continue the service of the vehicle and supply electric power to the auxiliary machine 8.

As explained above, in the diesel hybrid vehicle system according to the first embodiment, the connection destination of the converter is switched to the motor during the breakdown of the inverter. Therefore, there is an effect that, even if the inverter is disabled, it is possible to continue the service of the vehicle and the reliability of the diesel hybrid vehicle system is improved.

In the diesel hybrid vehicle system according to the first embodiment, the connection destination of the inverter is switched to the generator during the breakdown of the converter. Therefore, there is an effect that, even if the converter is disabled, it is possible to continue the service of the vehicle and the reliability of the diesel hybrid vehicle system is improved.

In the diesel hybrid vehicle system according to the first embodiment, the connection destination of the converter is switched to the auxiliary machine side during the breakdown of the auxiliary power supply device that performs power supply to the auxiliary machine. Therefore, there is an effect that, even if the auxiliary power supply device is disabled by a breakdown or the like, it is possible to continue the power supply to the auxiliary machine and the reliability of the diesel hybrid vehicle system is improved.

In the first embodiment, the embodiment in which the auxiliary power supply device that performs power supply to the auxiliary machine is included in the control targets for improvement of the reliability of the diesel hybrid vehicle system is explained. However, the auxiliary power supply device does not have to be included. Only the converter and the inverter can be included as the power converting device. Even in such a control form, it is possible to obtain the effect of this embodiment that, when at least one of the converter and the inverter is broken down, it is possible to continue the service of the vehicle.

In the above explanation, the diesel hybrid vehicle system mounted on the railway car is explained as the example. However, the diesel hybrid vehicle system is not limited to the railway car and can be applied to the field of a hybrid moving object (an automobile, a motorcycle, etc.), a hybrid construction machine (a dump truck, a bulldozer, a digger, etc.), or a ship mounted with the power storage device.

Second Embodiment

Figure 22:
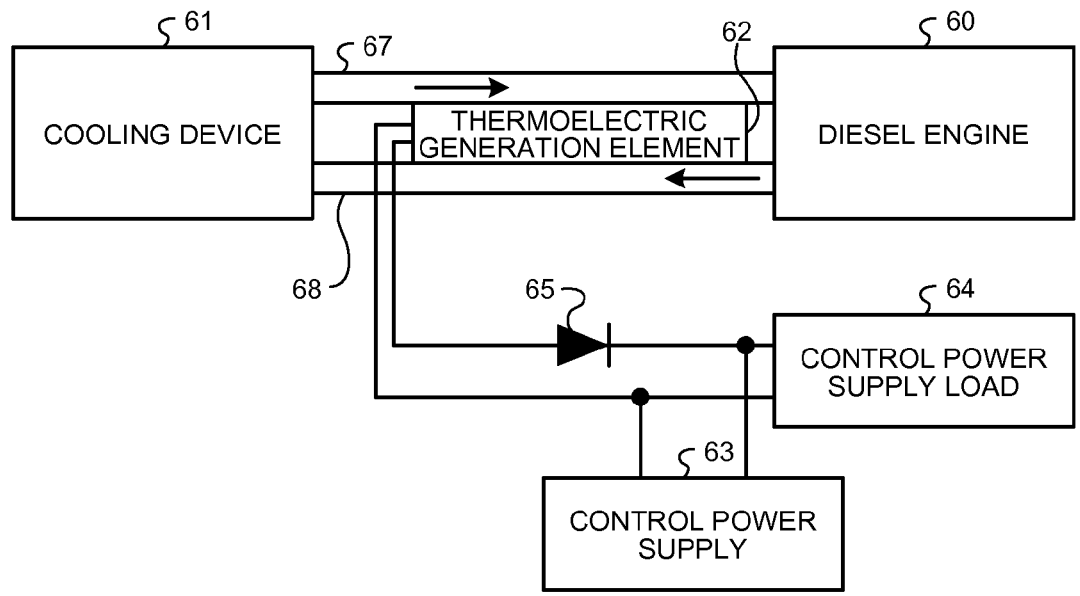
FIG. 22 is a diagram of a configuration example of a diesel engine system according to a second embodiment suitably used in the diesel hybrid vehicle system according to the first embodiment.

FIG. 22 is a diagram of a configuration example of the diesel engine system according to the second embodiment suitably used in the diesel hybrid vehicle system according to the first embodiment. The diesel engine system according to the second embodiment includes, as shown in FIG. 22, a diesel engine 60, a cooling device 61, a thermoelectric generation element 62, a control power supply 63, a control power supply load 64, a diode 65, a cooling-water supply pipe 67, and a cooling-water reflux pipe 68.

In FIG. 22, the cooling-water supply pipe 67 and the cooling-water reflux pipe 68 are arranged between the diesel engine 60 and the cooling device 61. The diesel engine 60 is configured to be cooled by cooling water that circulates through the cooling-water supply pipe 67 and the cooling-water reflux pipe 68. The thermoelectric generation element 62 is arranged in contact with the cooling-water supply pipe 67 and the cooling-water reflux pipe 68 between the cooling-water supply pipe 67 and the cooling-water reflux pipe 68. The thermoelectric generation element 62 is a thermoelectric generation element that makes use of the Seebeck effect for generating power making use of a temperature difference. The thermoelectric generation element 62 converts thermal energy corresponding to a temperature difference of the cooling water (the cooling-water reflux pipe 68 is a high-temperature side and the cooling-water supply pipe 67 is a low-temperature side) into electric energy, supplies the electric energy to the control power supply load 64 through the diode 65 for backflow prevention, and accumulates excess power in the control power supply 63.

As a typical thermoelectric generation element at the time of the application of the present invention, a thermoelectric generation element having a generation output per one element of about "8V-3A" has been announced. A control power supply voltage used in a railway car is about several volts to 100 volts. Therefore, if fifteen pieces of the thermoelectric generation element are connected in series at the maximum, the thermoelectric generation elements can be applied to all control power supplies. When the capacity of a control power supply is large, element groups connected in series only have to be connected in parallel and used. The capacity of the generation element of this type is relatively small (in the thermoelectric generation element in this embodiment, about ten-odd $cm^3$ per one element). Therefore, it is possible to array a large number of elements or element groups. It is possible to adapt the thermoelectric generation element to a plurality of kinds of control power supplies having different control power supply voltages and different capacities.

In the diesel engine system according to the second embodiment, the thermoelectric generation is performed making use of heat generation (waste heat) of the diesel engine and the generated power is used as electric energy of the control power supply for controlling the diesel engine system. Therefore, it is possible to reduce total energy consumed by the entire vehicle.

In the diesel engine system according to the second embodiment, the thermoelectric generation is performed making use of a temperature difference of the cooling water for cooling the diesel engine. Therefore, it is possible to reduce a waste heat capacity of the cooling water and reduce a cooling device capacity.

Figure 23:
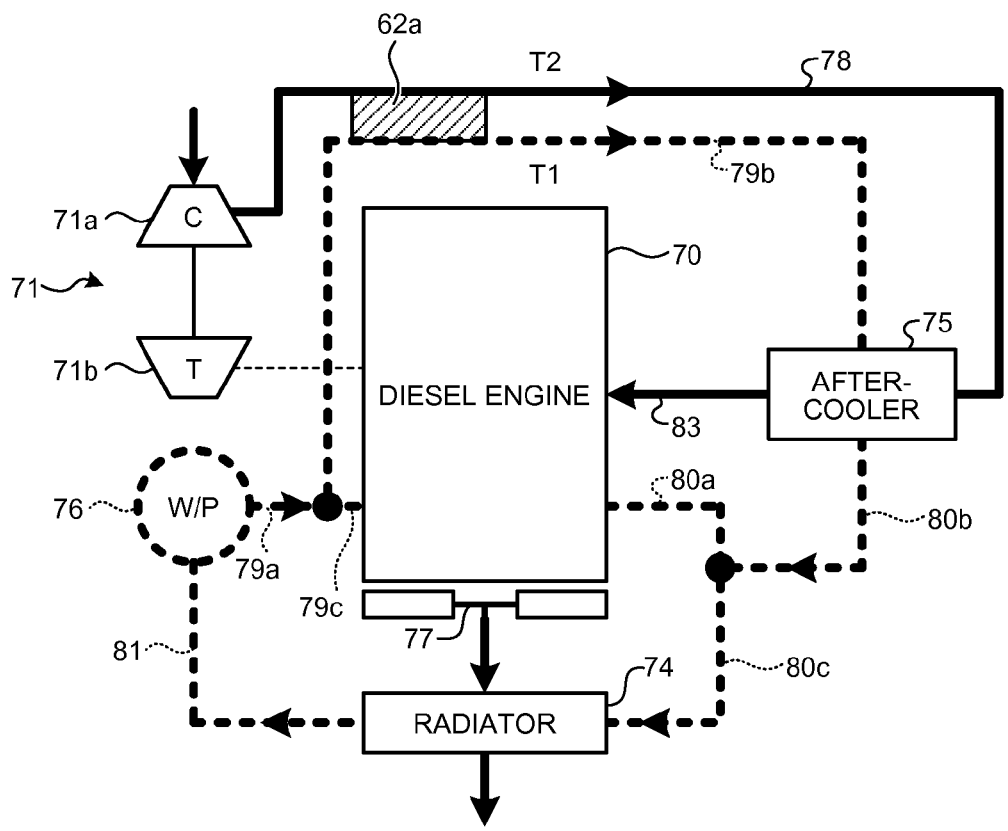
FIG. 23 is a diagram of a configuration example of the diesel engine system according to the second embodiment applied to a water-cooling after-cooler system.
Figure 24:
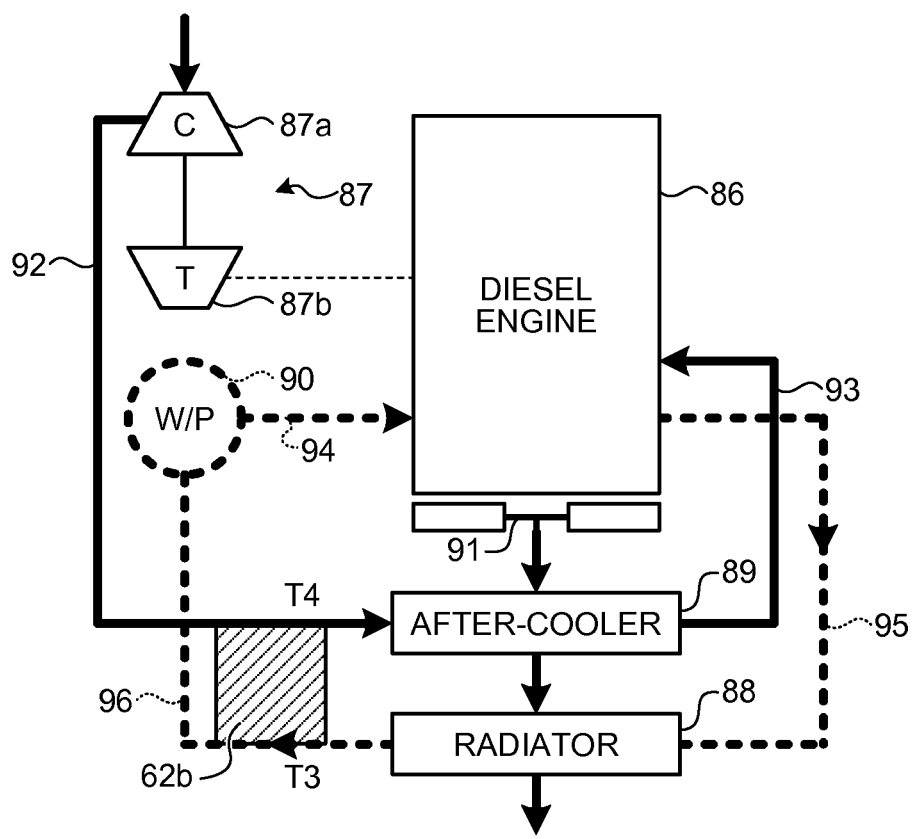
FIG. 24 is a diagram of a configuration example of the diesel engine system according to the second embodiment applied to an air-cooling after-cooler system.

FIGS. 23 and 24 are diagrams of more specific application examples of the diesel engine system according to the second embodiment. FIG. 23 is a configuration example of the diesel engine system applied to a diesel engine system of a water-cooling after-cooler system. FIG. 24 is a configuration example of the diesel engine system applied to a diesel engine system of an air-cooling after-cooler system.

First, the diesel engine system of the water-cooling after-cooler system is explained. In the diesel engine system, as shown in FIG. 23, a diesel engine 70, a supercharger 71 including a compressor 71a and a turbine 71b, a radiator 74, an after-cooler 75, a water pump 76, and a propeller fan 77 are arranged in key positions. A first compressed-air supply pipe 78 is disposed between the compressor 71a and the after-cooler 75. The first compressed-air supply pipe 78 changes to a second compressed-air supply pipe 83 on the outlet side of the after-cooler 75. The second compressed-air supply pipe 83 is disposed between the after-cooler 75 and the diesel engine 70.

A first cooling-water supply pipe 79a and a second cooling-water supply pipe 79b, which is a branch pipe on one side of the first cooling-water supply pipe 79a, are disposed between the water pump 76 and the after-cooler 75. The first cooling-water supply pipe 79a and a third cooling-water supply pipe 79c, which is a branch pipe on the other side of the first cooling-water supply pipe 79a, are disposed between the water pump 76 and the diesel engine 70. The third cooling-water supply pipe 79c changes to a first cooling-water discharge pipe 80a on the output side of the diesel engine 70. The second cooling-water supply pipe 79b changes to a second cooling-water discharge pipe 80b on the output side of the after-cooler 75. The first cooling-water discharge pipe 80a and the second cooling-water discharge pipe 80b merge to change to a third cooling-water discharge pipe 80c. The third cooling-water discharge pipe 80c is disposed between the after-cooler 75 and the radiator 74. The third cooling-water discharge pipe 80c changes to the third cooling-water discharge pipe 80c on the outlet side of the radiator 74 and returns to the water pump 76.

When the temperature of the second cooling-water supply pipe 79b is represented as T1 and the temperature of the first compressed-air supply pipe 78 is represented as T2, there is a relation T1<T2. In a typical diesel engine system of the water-cooling after-cooler system, a temperature difference of about 80° C. is obtained as T2−T1, i.e., a temperature difference between the first compressed-air supply pipe 78 and the second cooling-water supply pipe 79b. Therefore, as shown in the figure, if a thermoelectric generation element 62a is disposed in contact with each of the first compressed-air supply pipe 78 and the second cooling-water supply pipe 79b between the first compressed-air supply pipe 78 and the second cooling-water supply pipe 79b, it is possible to generate electric power making use of the temperature difference of about 80° C.

The diesel engine system of the air-cooling after-cooler system is explained. In the diesel engine system of the air-cooling after-cooler system, as shown in FIG. 24, a diesel engine 86, a supercharger 87 including a compressor 87a and a turbine 87b, a radiator 88, an after-cooler 89, a water pump 90, and a propeller fan 91 are arranged in key positions. A first compressed-air supply pipe 92 is disposed between the compressor 87a and the after-cooler 89. The first compressed-air supply pipe 92 changes to a second compressed-air supply pipe 93 on the output side of the after-cooler 89. The second compressed-air supply pipe 93 is disposed between the after-cooler 89 and the diesel engine 86.

A first cooling-water supply pipe 94 is disposed between the water pump 90 and the diesel engine 86. The first cooling-water supply pipe 94 changes to a first cooling-water discharge pipe 95 on the outlet side of the diesel engine 86. The first cooling-water discharge pipe 95 is disposed between the diesel engine 86 and the radiator 88. The first cooling-water discharge pipe 95 changes to a second cooling-water discharge pipe 96 on the outlet side of the radiator 88 and returns to the water pump 90.

When the temperature of the second cooling-water discharge pipe 96 is represented as T3 and the temperature of the first compressed-air supply pipe 92 is represented as T4, there is a relation T3<T4. In a typical diesel engine system of the water-cooling after-cooler system, a temperature difference of about a hundred and ten-odd ° C. is obtained as T4−T3, i.e., a temperature difference between the first compressed-air supply pipe 92 and the second cooling-water discharge pipe 96. Therefore, as shown in the figure, if a thermoelectric generation element 62b is disposed in contact with each of the first compressed-air supply pipe 92 and the second cooling-water discharge pipe 96 between the first compressed-air supply pipe 92 and the second cooling-water discharge pipe 96, it is possible to generate electric power making use of the temperature difference of about a hundred and ten-odd ° C.

Industrial Applicability

As explained above, the diesel hybrid vehicle system according to the present invention is useful as an invention for enabling continuation of the service of the vehicle even if the inverter is disabled by a breakdown or the like.

Reference Signs List 1, 60, 70, 80 diesel engines
2 generator
3 converter
4 inverter (first inverter)
5 motor
6 power storage device
7 auxiliary power supply device (second inverter)
8 auxiliary machine
9 first switcher
10 second switcher
11 third switcher
12 fourth switcher
13 first contactor
14 second contactor
15 third contactor
20, 21 filter capacitors
22, 23, 24 current detectors
25 to 27 voltage detectors
28, 29 rotation detectors
30 connecting unit
50 control unit
61 cooling device
62, 62a, 62b thermoelectric generation elements
63 control power supply
64 control power supply load
65 diode
67 cooling-water supply pipe
68 cooling-water reflux pipe
71, 87 superchargers
71a, 87a compressors (C)
71b, 87b turbines (T)
74, 88 radiators
75, 89 after-coolers
76, 90 water pumps (W/Ps)
77, 91 propeller fans
78, 92 first compressed-air supply pipes
79a, 94 first cooling-water supply pies
79b second cooling-water supply pipe
79c third cooling-water supply pipe
80c fourth cooling-water supply pipe
80a, 95 first cooling-water discharge pipes
80b, 96 second cooling-water discharge pipes
81 third cooling-water discharge pipe
83, 93 second compressed-air supply pipes

The invention claimed is:

1. A vehicle control device comprising:
a converter configured to receive, from an alternating-current end side, input of alternating-current power generated by a generator, convert the alternating-current power into direct-current power, and output the direct-current power from a direct-current end side, the generator generating the alternating-current power with an output of a diesel engine;
a first inverter configured to receive, from a direct-current end side, input of direct-current power discharged by a power storage device or the direct-current power output by the converter, convert the direct-current power into alternating-current power, and output the alternating-current power from an alternating-current end side to a motor that drives a vehicle, the power storage device charging and discharging the direct-current power;

a second inverter configured to receive, from a direct-current end side, input of the direct-current power discharged by the power storage device or the direct-current power output by the converter, convert the direct-current power into alternating-current power, output the alternating-current power from an alternating-current end side, and supply the alternating-current power to an auxiliary machine;

a first switcher including a function of connecting the generator and the alternating-current end side of the converter, a function of connecting a connection destination of the alternating-current end side of the converter to the motor or the auxiliary machine, and a function of connecting a connection destination of the generator to the motor or the auxiliary machine;

a second switcher including a function of connecting the alternating-current end side of the first inverter and the motor, a function of connecting the alternating-current side of the second inverter and the auxiliary machine, a function of connecting a connection destination of the motor to the first switcher, a function of connecting a connection destination of the alternating-current end side of the second inverter to the first switcher, a function of connecting the connection destination of the second inverter connected to the auxiliary machine to the motor, a function of connecting a connection destination of the auxiliary machine to the first switcher, a function of connecting a connection destination of the alternating-current end side of the first inverter to the first switcher, and a function of connecting the connection destination of the alternating-current end side of the first inverter to the auxiliary machine; and a control unit configured to control operations of the converter, the first inverter, and the second inverter and the first and second switchers, wherein when the diesel engine is being started up and when the converter and the first inverter are broken down or when the converter and the second inverter are broken down, the control unit performs control for controlling the first and second switchers, switching a connection destination of the generator connected to the alternating-current end side of the converter from the converter to the motor via the first and second switchers, controlling number of revolutions of the diesel engine, and controlling the alternating-current power generated by the generator to desired alternating-current power to drive the motor.

2. The vehicle control device according to claim 1, wherein, when first inverter is broken down, the control unit controls the first and second switchers, switches the connection destination of the generator from the motor to the alternating-current end side of the second inverter, causes the second inverter to operate as a converter, and converts the alternating-current power generated by the generator into direct-current power to charge the power storage device.

3. The vehicle control device according to claim 1, wherein, when second inverter is broken down, the control unit controls the first and second switchers, switches the connection destination of the generator from the motor to the alternating-current end side of the first inverter, causes the first inverter to operate as a converter, and converts the alternating-current power generated by the generator into direct-current power to charge the power storage device.

4. The vehicle control device according to claim 2, wherein, when first inverter is broken down, the control unit performs control for controlling the first and second switchers, switching the connection destination of the alternating-current end side of the second inverter from the auxiliary machine to the motor, causing the second inverter to operate, converting the direct-current power discharged by the power storage device into alternating-current power, and supplying the alternating-current power to the motor.

5. The vehicle control device according to claim 3, wherein, when second inverter is broken down, the control unit performs control for controlling the first and second switchers, switching the connection destination of the alternating-current end side of the first inverter from the motor to the auxiliary machine, causing the first inverter to operate, converting the direct-current power discharged by the power storage device into alternating-current power, and supplying the alternating-current power to the motor.

6. The vehicle control device according to claim 2, wherein, when the diesel engine is being started up and during a breakdown of the first inverter and when the second inverter is broken down and the second inverter is driving the motor, the control unit controls the first and second switchers, connects the generator to the motor, controls number of revolutions of the diesel engine, controls the alternating-current power generated by the generator to desired alternating-current power, and continues the driving of the motor.

7. The vehicle control device according to claim 3, wherein, when the diesel engine is being started up and during a breakdown of the second inverter and when the first inverter is broken down and the first inverter is supplying alternating-current power to the auxiliary machine, the control unit controls the first and second switchers, connects the generator to the auxiliary machine, controls number of revolutions of the diesel engine, controls the alternating-current power generated by the generator to desired alternating-current power, and continues the power supply to the auxiliary machine.

8. The vehicle control device according to claim 2, wherein, when the diesel engine is being started up and during a breakdown of the first inverter and when the second inverter is broken down and the second inverter is supplying alternating-current power to the auxiliary machine, the control unit controls the first and second switchers, connects the generator to the auxiliary machine, controls number of revolutions of the diesel engine, controls the alternating-current power generated by the generator to desired alternating-current power, and continues the power supply to the auxiliary machine.

9. The vehicle control device according to claim 3, wherein, when the diesel engine is being started up and during a breakdown of the second inverter and when the first inverter is broken down and the first inverter is driving the motor, the control unit controls the first and second switchers, connects the generator to the motor, controls number of revolutions of the diesel engine, controls the alternating-current power generated by the generator to desired alternating-current power, and continues the driving of the motor.

10. A vehicle control device comprising:
a converter configured to receive, from an alternating-current end side, input of alternating-current power generated by a generator, convert the alternating-current power into direct-current power, and output the direct-current power from a direct-current end side, the generator generating the alternating-current power with an output of a diesel engine;

a first inverter configured to receive, from a direct-current end side, input of direct-current power discharged by a power storage device or the direct-current power output by the converter, convert the direct-current power into alternating-current power, and output the alternating-current power from an alternating-current end side to a motor that drives a vehicle, the power storage device charging and discharging the direct-current power;

a second inverter configured to receive, from a direct-current end side, input of the direct-current power discharged by the power storage device or the direct-current power output by the converter, convert the direct-current power into alternating-current power, output the alternating-current power from an alternating-current end side, and supply the alternating-current power to an auxiliary machine;

a first switcher including a function of connecting the generator and the alternating-current end side of the converter, a function of connecting a connection destination of the alternating-current end side of the converter to the motor or the auxiliary machine, and a function of connecting a connection destination of the generator to the motor or the auxiliary machine;

a second switcher including a function of connecting the alternating-current end side of the first inverter and the motor, a function of connecting the alternating-current side of the second inverter and the auxiliary machine, a function of connecting a connection destination of the motor to the first switcher, a function of connecting a connection destination of the alternating-current end side of the second inverter to the first switcher, a function of connecting the connection destination of the second inverter connected to the auxiliary machine to the motor, a function of connecting a connection destination of the auxiliary machine to the first switcher, a function of connecting a connection destination of the alternating-current end side of the first inverter to the first switcher, and a function of connecting the connection destination of the alternating-current end side of the first inverter to the auxiliary machine; and a control unit configured to control operations of the converter, the first inverter, and the second inverter and the first and second switchers, wherein when the diesel engine is being started up, the control unit control, when the converter and the first inverter are broken down or when the converter and the second inverter are broken down, the first and second switchers, switches a connection destination of the generator connected to the alternating-current end side of the converter from the converter to the auxiliary machine via the first and second switchers, controls number of revolutions of the diesel engine, and controls the alternating-current power generated by the generator to desired alternating-current power to cause the auxiliary machine to operate.

11. The vehicle control device according to claim 10, wherein, when first inverter is broken down, the control unit controls the first and second switchers, switches the connection destination of the generator from the motor to the alternating-current end side of the second inverter, causes the second inverter to operate as a converter, and converts the alternating-current power generated by the generator into direct-current power to charge the power storage device.

12. The vehicle control device according to claim 10, wherein, when second inverter is broken down, the control unit controls the first and second switchers, switches the connection destination of the generator from the motor to the alternating-current end side of the first inverter, causes the first inverter to operate as a converter, and converts the alternating-current power generated by the generator into direct-current power to charge the power storage device.

13. The vehicle control device according to claim 11, wherein, when first inverter is broken down, the control unit performs control for controlling the first and second switchers, switching the connection destination of the alternating-current end side of the second inverter from the auxiliary machine to the motor, causing the second inverter to operate, converting the direct-current power discharged by the power storage device into alternating-current power, and supplying the alternating-current power to the motor.

14. The vehicle control device according to claim 12, wherein, when second inverter is broken down, the control unit performs control for controlling the first and second switchers, switching the connection destination of the alternating-current end side of the first inverter from the motor to the auxiliary machine, causing the first inverter to operate, converting the direct-current power discharged by the power storage device into alternating-current power, and supplying the alternating-current power to the motor.

15. The vehicle control device according to claim 11, wherein, when the diesel engine is being started up and during a breakdown of the first inverter and when the second inverter is broken down and the second inverter is driving the motor, the control unit controls the first and second switchers, connects the generator to the motor, controls number of revolutions of the diesel engine, controls the alternating-current power generated by the generator to desired alternating-current power, and continues the driving of the motor.

16. The vehicle control device according to claim 12, wherein, when the diesel engine is being started up and during a breakdown of the second inverter and when the first inverter is broken down and the first inverter is supplying alternating-current power to the auxiliary machine, the control unit controls the first and second switchers, connects the generator to the auxiliary machine, controls number of revolutions of the diesel engine, controls the alternating-current power generated by the generator to desired alternating-current power, and continues the power supply to the auxiliary machine.

17. The vehicle control device according to claim 11, wherein, when the diesel engine is being started up and during a breakdown of the first inverter and when the second inverter is broken down and the second inverter is supplying alternating-current power to the auxiliary machine, the control unit controls the first and second switchers, connects the generator to the auxiliary machine, controls number of revolutions of the diesel engine, controls the alternating-current power generated by the generator to desired alternating-current power, and continues the power supply to the auxiliary machine.

18. The vehicle control device according to claim 12, wherein, when the diesel engine is being started up and during a breakdown of the second inverter and when the first inverter is broken down and the first inverter is driving the motor, the control unit controls the first and second switchers, connects the generator to the motor, controls number of revolutions of the diesel engine, controls the alternating-current power generated by the generator to desired alternating-current power, and continues the driving of the motor.

19. A diesel hybrid vehicle system comprising:
a diesel engine;
a motor configured to drive a vehicle;
a generator configured to generate alternating-current power with an output of the diesel engine;
a power storage device configured to charge and discharge direct-current power;
a converter configured to receive, from an alternating-current end side, input of alternating-current power generated by a generator, convert the alternating-current power into direct-current power, and output the direct-current power from a direct-current end side;
a first inverter configured to receive, from a direct-current end side, input of direct-current power discharged by the power storage device or the direct-current power output by the converter, convert the direct-current power into alternating-current power, and output the alternating-current power from an alternating-current end side to a motor that drives a vehicle;

a second inverter configured to receive, from a direct-current end side, input of the direct-current power discharged by the power storage device or the direct-current power output by the converter, convert the direct-current power into alternating-current power, output the alternating-current power from an alternating-current end side, and supply the alternating-current power to an auxiliary machine;

a first switcher including a function of connecting the generator and the alternating-current end side of the converter, a function of connecting a connection destination of the alternating-current end side of the converter to the motor or the auxiliary machine, and a function of connecting a connection destination of the generator to the motor or the auxiliary machine;

a second switcher including a function of connecting the alternating-current end side of the first inverter and the motor, a function of connecting the alternating-current side of the second inverter and the auxiliary machine, a function of connecting a connection destination of the motor to the first switcher, a function of connecting a connection destination of the alternating-current end side of the second inverter to the first switcher, a function of connecting the connection destination of the second inverter connected to the auxiliary machine to the motor, a function of connecting a connection destination of the auxiliary machine to the first switcher, a function of connecting a connection destination of the alternating-current end side of the first inverter to the first switcher, and a function of connecting the connection destination of the alternating-current end side of the first inverter to the auxiliary machine; and a control unit configured to control operations of the converter, the first inverter, and the second inverter and the first and second switchers, wherein when the diesel engine is being started up and when the converter and the first inverter are broken down or when the converter and the second inverter are broken down, the control unit performs control for controlling the first and second switchers, switching a connection destination of the generator connected to the alternating-current end side of the converter from the converter to the motor via the first and second switchers, controlling number of revolutions of the diesel engine, and controlling the alternating-current power generated by the generator to desired alternating-current power to drive the motor.

* * * * *